United States Patent
Goel et al.

(10) Patent No.: US 11,599,378 B2
(45) Date of Patent: Mar. 7, 2023

(54) DATA ENCRYPTION KEY MANAGEMENT SYSTEM

(71) Applicant: Dell Products L.P., Round Rock, TX (US)

(72) Inventors: Naman Goel, Bangalore (IN); Ravishankar Kanakapura Nanjundaswamy, Bangalore (IN); Sharad Awasthi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 17/115,998

(22) Filed: Dec. 9, 2020

(65) Prior Publication Data
US 2022/0179674 A1 Jun. 9, 2022

(51) Int. Cl.
*G06F 9/455* (2018.01)
*H04L 9/08* (2006.01)
*H04L 9/32* (2006.01)
*H04L 9/40* (2022.01)

(52) U.S. Cl.
CPC ........ *G06F 9/45558* (2013.01); *H04L 9/0819* (2013.01); *H04L 9/0897* (2013.01); *H04L 9/3247* (2013.01); *H04L 9/3263* (2013.01); *H04L 63/0428* (2013.01); *G06F 2009/45587* (2013.01)

(58) Field of Classification Search
CPC ....... G06F 9/45558; G06F 2009/45587; H04L 9/0819; H04L 9/0897; H04L 9/3247; H04L 9/3263; H04L 9/0894; H04L 63/0428; H04L 63/062
See application file for complete search history.

(56) References Cited

U.S. PATENT DOCUMENTS

| | | | |
|---|---|---|---|
| 10,951,656 B2* | 3/2021 | Xu | H04L 63/14 |
| 2017/0085383 A1* | 3/2017 | Rao | G06F 21/575 |
| 2018/0063166 A1* | 3/2018 | Warden | H04L 63/061 |
| 2019/0045358 A1* | 2/2019 | Ahmed | H04W 12/04 |
| 2019/0053290 A1* | 2/2019 | Raju | H04W 40/244 |
| 2020/0326963 A1* | 10/2020 | Bhattacharya | H04L 41/0895 |
| 2021/0336772 A1* | 10/2021 | Debata | G06F 9/45558 |

* cited by examiner

*Primary Examiner* — Alina A Boutah
(74) *Attorney, Agent, or Firm* — Joseph Mencher

(57) ABSTRACT

A data encryption key management system includes an application layer with a hypervisor and a virtual machine, a host operating system coupled to the application layer and including a key management agent, and a Baseboard Management Controller (BMC) device coupled to the host operating system and including a BMC storage device providing a key vault. The BMC device receives a first stored data encryption key that was generated by the hypervisor for the virtual machine from the key management agent, and stores the first stored data encryption key in the key vault provided by the BMC storage device. The BMC device subsequently receives a stored data encryption key request from the key management agent and, in response, retrieves the first stored data encryption key from the key vault provided by the BMC storage device, and transmits the first stored data encryption key to the key management agent.

20 Claims, 20 Drawing Sheets

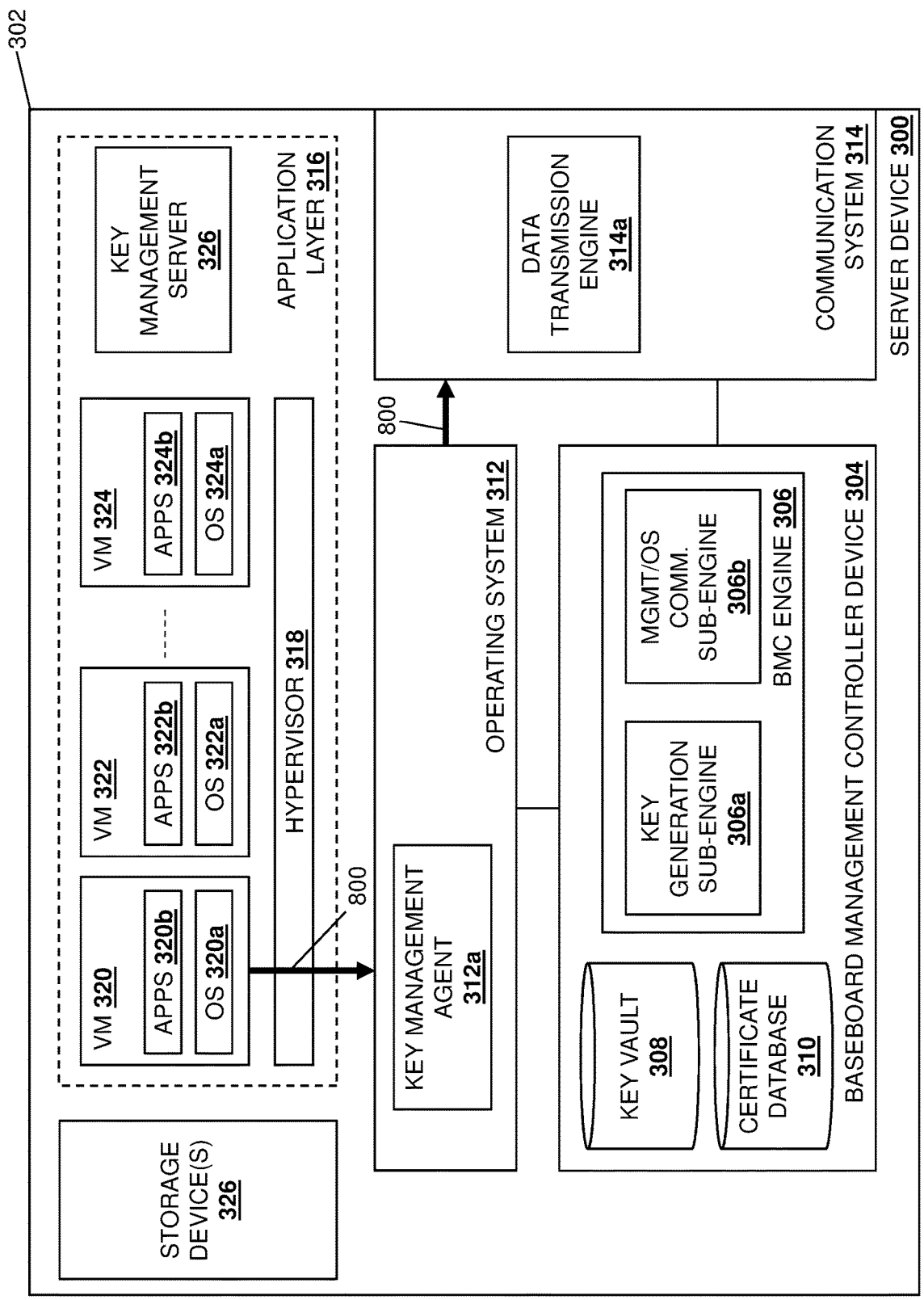

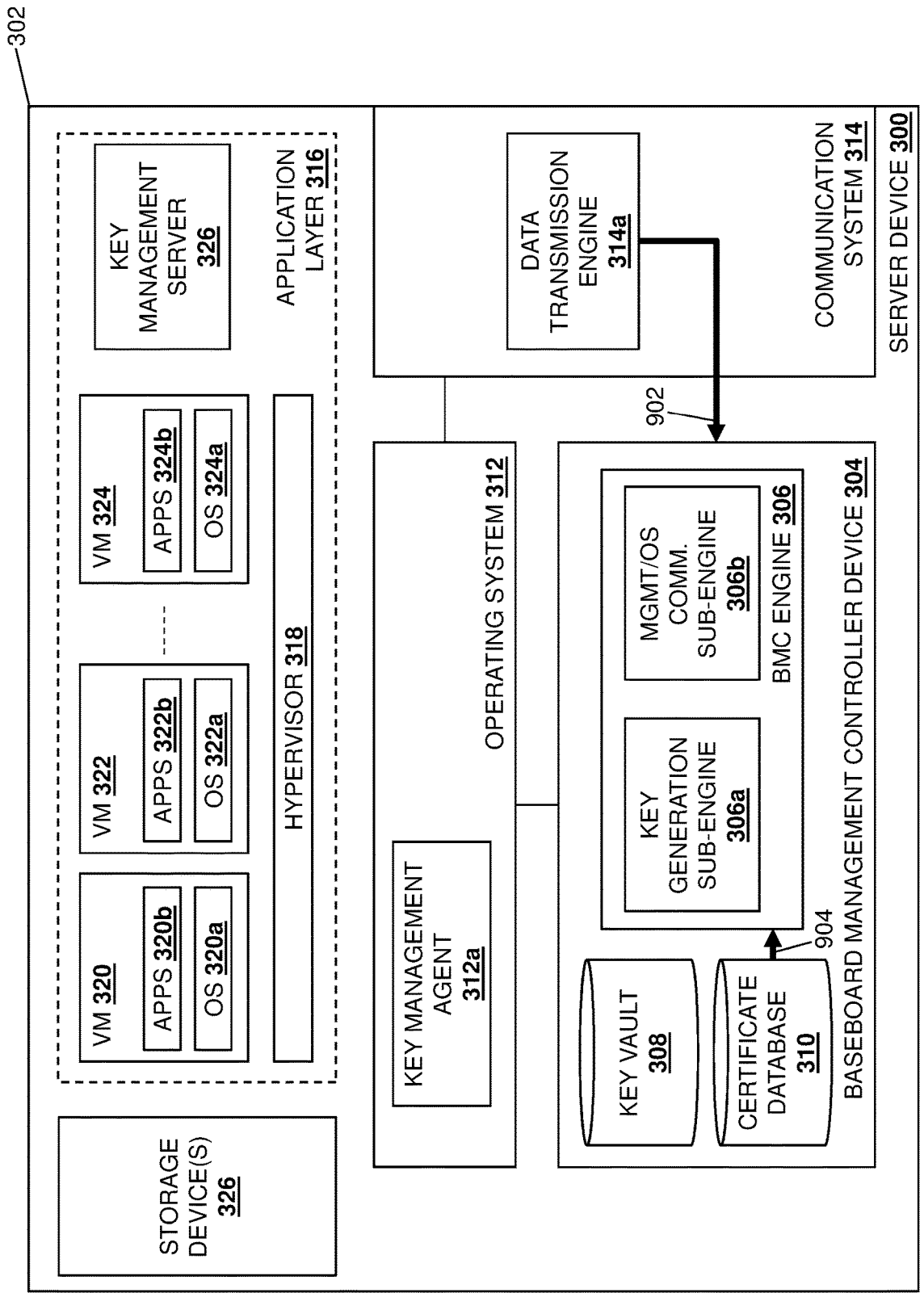

DATA ENCRYPTION KEY MANAGEMENT SYSTEM

BACKGROUND

The present disclosure relates generally to information handling systems, and more particularly to managing data encryption keys for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, sometimes utilize data encryption keys at the application layer for encrypting and decrypting data generated and/or transmitted by those server devices (e.g., data generated and/or transmitted by operating systems and/or other applications provided by Virtual Machines (VMs) running in those server devices). Conventionally, those data encryption keys may be managed using key management server devices that are provided in a cloud infrastructure and dedicated to managing data encryption keys via a cloud management console ("conventional cloud key management"), or using an Active Directory (AD) that may be part of a Local Area Network (LAN) that includes the server devices ("conventional local key management"). As such, data encryption keys for any server device may be maintained in an external key management system and provided on request via an external network, or may be maintained in a local Active Directory system and provided on request via a local network. The management of data encryption keys in such conventional manners raises some issues.

For example, any unavailability of the key management server devices or the Active Directory prevents access to the data encryption keys, thus preventing access to the data encrypted with those data encryption keys, as well as the ability to encrypt new data for storage or transmission. Furthermore, the conventional local key management solutions are vendor-specific solutions that require configuration based on the types of operating system(s) used by the server devices, while the provisioning (or re-provisioning) of an operating system on a server device in the conventional cloud key management solutions is complicated because it requires streamlined network communications with the key management server devices to retrieve the data encryption key(s) needed to complete the boot process. Yet further still, in multi-site environments (e.g., where infrastructure spans different geographical locations), maintenance of the key management system can be relatively complex and may require multiple key management server devices at each location, while in key management systems where additional security is enabled (e.g., using hardware-attached Trusted Platform Modules (TPMs), Hardware Security Modules (HSMs), or virtual TPMs (vTPMs)), key maintenance becomes relatively more challenging as well. Finally, key management vendors utilize different encryption techniques for data transmitted via external networks and do not provide a native encryption method like those utilized with data that is stored, while any upgrade of an external key management server device requires further key management solutions in order to manage the storage of data encryption keys during the upgrade process.

Accordingly, it would be desirable to provide data encryption key management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Baseboard Management Controller (BMC) engine that is configured to: receive, from a key management agent included in a host operating system provided on a computing system, a first stored data encryption key generated by a hypervisor provided on the computing system for a virtual machine provided on the computing system; store the first stored data encryption key in a key vault provided by a BMC storage device included in the computing system; receive, from the key management agent subsequent to storing the first stored data encryption key in the key vault provided by the BMC storage device, a stored data encryption key request; and retrieve, in response to receiving the stored data encryption key request, the first stored data encryption key from the key vault provided by the BMC storage device, and transmit the first stored data encryption key to the key management agent.

BRIEF DESCRIPTION OF THE DRAWINGS

FIG. 8A is a schematic view illustrating an embodiment of the server device of FIG. 3 operating during the method of FIG. 4.

FIG. 9B is a schematic view illustrating an embodiment of the server device of FIG. 3 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
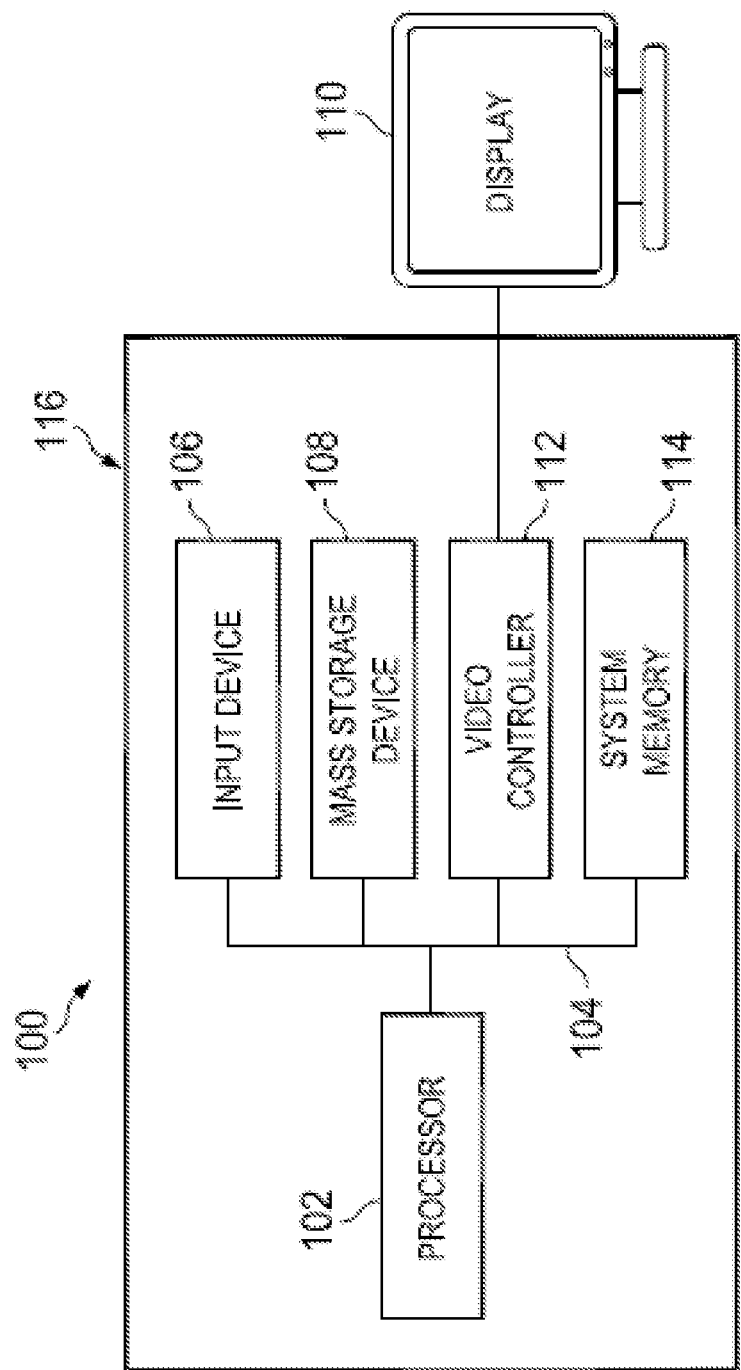
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
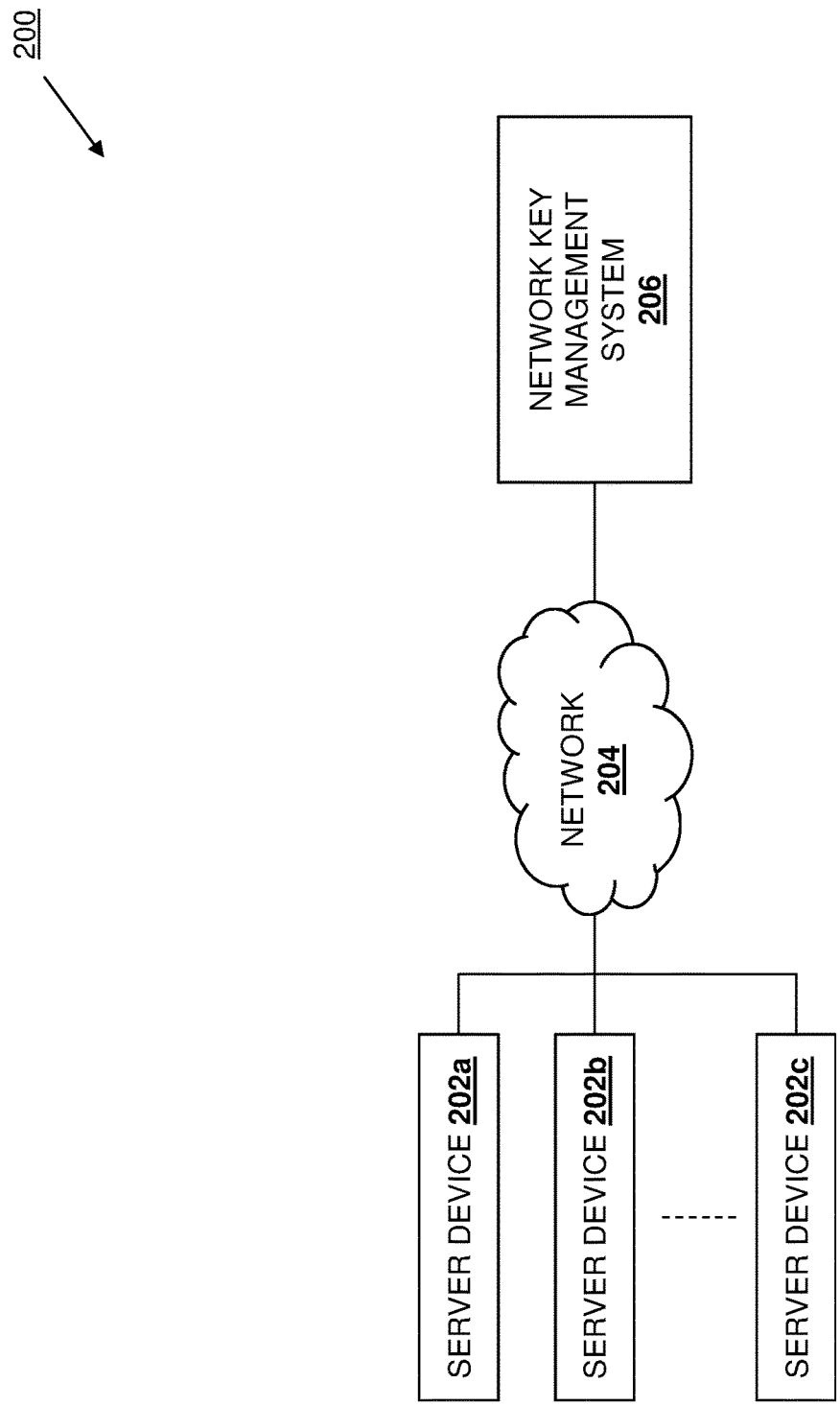
FIG. 2 is a schematic view illustrating an embodiment of a networked system.

Referring now to FIG. 2, an embodiment of a networked system 200 is illustrated. In the illustrated embodiment, the networked system 200 includes a plurality of computing systems such as the server devices 202a, 202b, and up to 202c. In an embodiment, any or all of the server devices 202a-202c may be provided by the IHS 100 discussed above with reference to FIG. 1, and/or may include some or all of the components of the IHS 100. However, while illustrated and discussed as being provided by server devices, one of skill in the art in possession of the present disclosure will recognize that the server devices 202a-202c provided in the networked system 200 may be replaced by any computing systems that may be configured to operate similarly as the server devices discussed below. In the illustrated embodiment, the server devices 202a-202c may be coupled to network 204 that may be provided by a Local Area Network (LAN), the Internet, combinations thereof, and/or other networks known in the art.

Furthermore, a network key management system 206 may be coupled to the network 204. In an embodiment, the network key management system 206 may be provided by the IHS 100 discussed above with reference to FIG. 1, and/or may include some or all of the components of the IHS 100, and in specific examples may be provided by one or more key management server devices. As will be appreciated by one of skill in the art in possession of the present disclosure, in some embodiments the network key management system 206 may be provided using conventional key management cloud infrastructure that may operate with the data encryption key management system of the present disclosure. However, while a specific networked system 200 has been illustrated and described, one of skill in the art in possession of the present disclosure will recognize that the data encryption key management system of the present disclosure may be provided in other networked systems that may include a variety of components and component configurations while remaining within the scope of the present disclosure as well.

Figure 3:
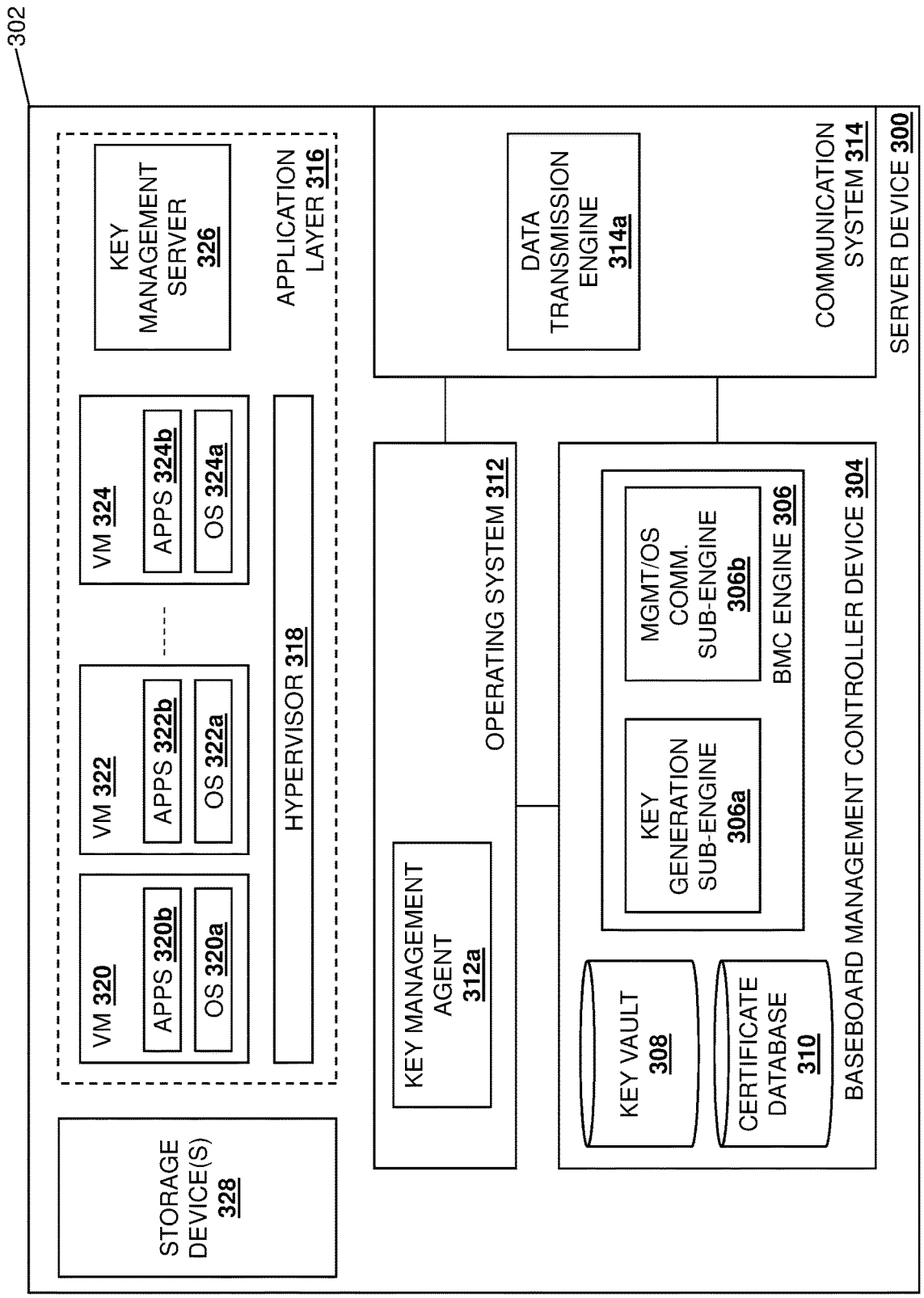
FIG. 3 is a schematic view illustrating an embodiment of a server device that may be included in the networked system of FIG. 2 and that may provide the data encryption key management system of the present disclosure.

Referring now to FIG. 3, an embodiment of a server device 300 is illustrated that may provide any or all of the server devices 202a-202c discussed above with reference to FIG. 2. As such, the server device 300 may be provided by the IHS 100 discussed above with reference to FIG. 1 and/or may include some or all of the components of the IHS 100.

Furthermore, while illustrated and discussed as being provided by a server device, one of skill in the art in possession of the present disclosure will recognize that the functionality of the server device 300 discussed below may be provided by other computing systems that are configured to operate similarly as the server device 300 discussed below. In the illustrated embodiment, the server device 300 includes a chassis 302 that houses the components of the server device 300, only some of which are illustrated below. For example, the chassis 302 may house a Baseboard Management Controller (BMC) device 304 that may be provided by the integrated DELL® Remote Access Controller (iDRAC) available from DELL® Inc. of Round Rock, Tex., United States, and/or other BMC devices that would be apparent to one of skill in the art in possession of the present disclosure.

In an embodiment, the BMC device 304 may include a BMC processing system (not illustrated, but which may include the processor 102 discussed above with reference to FIG. 1) and a BMC memory system (not illustrated, but which may include the memory 114 discussed above with reference to FIG. 1) that is coupled to the BMC processing system and that includes instructions that, when executed by the BMC processing system, cause the BMC processing system to provide a BMC engine 306 that is configured to perform the functionality of the BMC engines and/or BMC devices discussed below. In the specific examples provided below, the BMC engine 306 may include a key generation sub-engine 306a that may be provided by hardware (e.g., as part of the BMC processing system) and/or software (e.g., instruction stored on the BMC memory system), and that may be configured to operate as a random key generator that uses a private key (e.g., a BMC vendor private key controlled by a BMC vendor) stored in the BMC device 304 to generate the transmitted data encryption keys that are discussed below as being utilized to encrypt and decrypt data transmitted via the network 204.

In the specific examples provided below, the BMC engine 306 may also include a management (MGMT)/operating system communication (OS COMM.) sub-engine 306b that may be provided by hardware (e.g., a System on Chip (SoC) included in the BMC processing system) and/or software (e.g., a virtual machine/container provided by instructions stored on the BMC memory system), and that may be configured to bifurcate responsibilities of the BMC engine 306/BMC device 304 while the server device 300 is in a pre-boot environment (as discussed in further detail below) by providing a management subsystem that handles management functionality for the BMC engine 306/BMC device 304, and providing an operating system interaction subsystem that dynamically hosts relatively small operating system images used to provide BMC operating systems that interact with a host operating system (e.g., using Intelligent Platform Management Interface (IPMI) channels, REpresentational States Transfer (REST) interfaces, and/or other operating system couplingselow) to provide data encryption keys that enable initialization operations that provision the host operating system on the server device 300.

However, while the BMC engine 306 is illustrated and described as including specific sub-engines for performing specific functionality, one of skill in the art in possession of the present disclosure will appreciate that the BMC engine 306 may perform other functionality while remaining within the scope of the present disclosure as well. For example, the BMC engine 306 may be configured to manage any data encryption keys stored on the BMC device 304, synchronize data encryption keys with a host operating system in the server device 300 (e.g., via an IPMI channel), and perform Key Management Interoperability Protocol (KMIP) operations promulgated by the Organization for the Advancement of Structured Information Standards (OASIS) consortium including creation operations (e.g., managed object creation such as symmetric key creation and identifier transmittal), get operations (e.g., object retrieval using identifiers), register operations (e.g., storage of externally generated key values), attribute handling operations (e.g., add/modify/get operations), locate operations, re-key-creation operations (e.g., to create a new key to replace an existing key), create key pair operations (e.g., to create asymmetric keys), certify operations (e.g., to certify a certificate), split/join operations (e.g., associated with n-of-m keys), encrypt/decrypt operations, import/export operations (e.g., importing/exporting keys to other systems operating as KMIP servers), and/or any other KMIP operations that would be apparent to one of skill in the art in possession of the present disclosure.

In an embodiment, the BMC device 304 may also include a BMC storage system (not illustrated, but which may include the storage 108 discussed above with reference to FIG. 1) that is coupled to the BMC engine 306 (e.g., via a coupling between the BMC storage system and the BMC processing system) and that includes a key vault 308 that is configured to store any of the data encryption keys utilized by the BIOS engine 306 discussed below, and a certificate database 310 that is configured to store any of the certificates (e.g., hardware certificates) utilized by the BIOS engine 306 discussed below. For example, the key vault 308 may be utilized to store data encryption keys that are utilized in the encryption of data generated by virtual infrastructure such as the virtual machines discussed below, and that are associated with identity information for those data encryption keys (e.g., identity information used for mapping those data encryption keys/virtual infrastructure keys with corresponding data encryption keys/virtual infrastructure keys maintained at the hypervisor layer and in a vendor-managed key agent on a host operating system in the server device 300), and may be involved in synchronization operations between the BMC device 304 and a host operating system in the server device 300 that operate to synchronize data encryption keys stored in the key vault 308. As will be appreciated by one of skill in the art in possession of the present disclosure, the key vault may also store Self Encrypting Drive (SED) keys, software keys, OS level keys, and/or other keys known in the art.

As illustrated, the chassis 302 may also house a host processing system (not illustrated, but which may include the processor 102 discussed above with reference to FIG. 1) and a host memory system (not illustrated, but which may include the memory 114 discussed above with reference to FIG. 1) that is coupled to the host processing system and that includes instructions that, when executed by the host processing system, cause the host processing system to provide a host operating system 312 that is coupled to the BMC device 304 (e.g., via the IPMI channel discussed above) and that is configured to perform the functionality of the host operating systems discussed below. As illustrated, the host operating system 312 may include a key management agent 312a that one of skill in the art in possession of the present disclosure will appreciate may be "pushed" on to the host operating system 312, and that may be configured to "pull" data encryption keys for virtual infrastructure (along with identity information) in order to perform data encryption key synchronization operations with the BMC device 304. For example, such data encryption key synchronization operations may be performed with the host operating system 312 for the virtual machines discussed below, and may include a hypervisor in the operating system/application layer generating data encryption keys, and those data encryption keys being synchronized and stored in the key vault 308. Subsequently, for any operation that requires data encryption keys, the host operating system 312 may request those data encryption keys via the key management agent 312a.

Furthermore, the key management agent 312a may be configured to perform a "handshake" between the BMC device 304 and the host operating system 312 (e.g., another key manager installed on the host operating system 312), and may contact the network key management system 206 (e.g., a cloud key management system) to access data encryption keys or associated data encryption key information (e.g., the session keys discussed below). As such, the key management agent 312a may include different plugins to interface with a management subsystem for virtual infrastructure (e.g., management subsystems provided by the AZURE® management portal, the AWS® management console, the OPENSTACK® dashboard, the GOGGLE® cloud console, the KUBERNETES® key management service, and/or other virtual infrastructure management subsystems known in the art). Furthermore, the key management agent 312a may operate to manage the data encryption keys/virtual infrastructure keys via an interface (e.g., a KMIP-compliant framework) that provides a vendor-agnostic framework, along with a plugin that is provided as part of a vendor solution and includes a vendor-specific implementation that enables management interactions that allow for the data encryption key management and exchange between the vendor system (e.g., the network key management system 206) and the server device 300.

In the illustrated embodiment, the chassis 302 also houses a communication system 314 that is coupled to the BMC device 304 and the host operating system 312 (e.g., via a coupling between the communication system 308 and the host processing system), and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As illustrated, the communication system 314 may include a data transmission engine 314a that may be configured to perform various data processing operations including the data encryption operations discussed below. In a specific example, the communications system 314 may be provided by a SmartNIC DEVICE, with the data transmission engine 314a provided by an SoC, Field Programmable Gate Array (FPGA) device, and/or other hardware accelerator device that one of skill in the art in possession of the present disclosure would recognize as capable of performing the data transmission engine functionality discussed below. However, while a specific communication system 314 is illustrated and described, one of skill in the art in possession of the present disclosure will appreciate that other communication systems will fall within the scope of the present disclosure as well.

As illustrated in FIG. 3, hardware (e.g., host processing systems) and/or software (e.g., instruction stored on host memory systems) housed in the chassis 302 may provide an application layer 316 for the server device 300 that includes a hypervisor 318 that may provide a plurality of Virtual Machines (VMs) 320, 322, and up to 324. As illustrated, each VM may include an operating system (OS) and one or more applications (APPS) such as the OS 320a and APPS 320b included in the VM 320, the OS 322a and APPS 322b included in the VM 322, and the OS 324a and APPS 324b included in the VM 324 in FIG. 3. As also illustrated in FIG. 3, the application layer 316 may also include a key management server 326 that may be managed by the vendor and maintained via a vendor cloud solution (e.g., the network key management system 206 provided by AZURE®, AWS®, and/or other cloud systems discussed above), with the key management agent 312a communicating with the key management server 326 in the application layer 316 to push/pull data encryption keys with the network key management system 206 via an interface. Furthermore, FIG. 3 illustrates how the chassis 302 may house one or more storage devices 328 that, as discussed below, may be utilized to store data that was generated by the VMs 320-324 and encrypted with data encryption keys managed using data encryption key management system of the present disclosure. While not discussed in detail herein, the storage device(s) 328 may be Self-Encrypting Drives (SED) encrypted using SED keys that may be stored in the key vault 308 included in the BMC device 304 along with the stored data encryption keys discussed below. However, while a specific server device 300 has been illustrated, one of skill in the art in possession of the present disclosure will recognize that server devices (or other computing systems operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
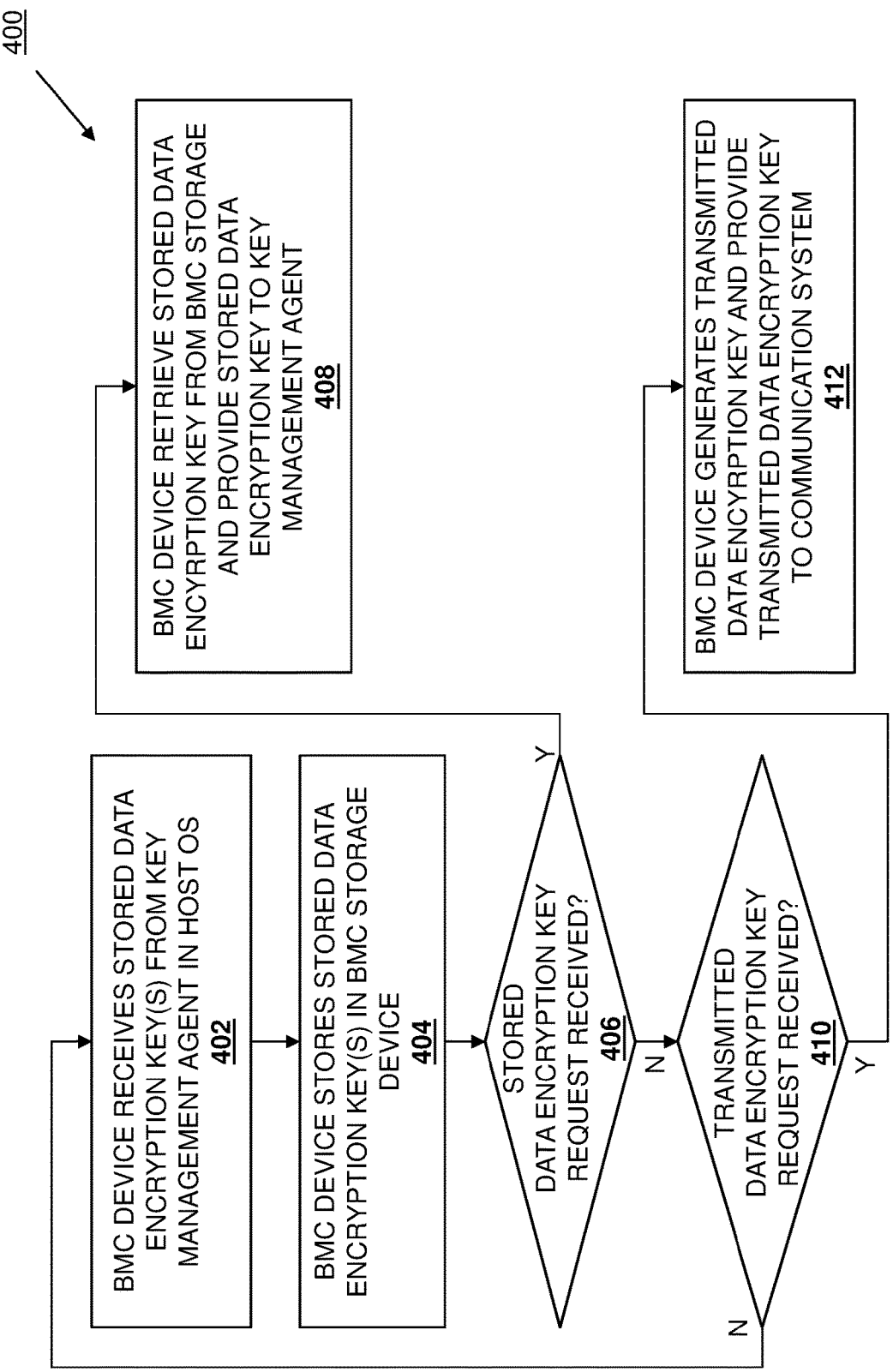
FIG. 4 is a flow chart illustrating an embodiment of a method for managing data encryption key.

Referring now to FIG. 4, an embodiment of a method 400 for managing data encryption keys is illustrated. As discussed below, the systems and methods of the present disclosure provide for the use of a native hardware layer in a server device for the secure management of data encryption keys that may be synchronized with external key management systems. For example, the data encryption key management system of the present disclosure includes an application layer with a hypervisor and a virtual machine, a host operating system coupled to the application layer and including a key management agent, and a Baseboard Management Controller (BMC) device coupled to the host operating system and including a BMC storage device providing a key vault. The BMC device receives a first stored data encryption key that was generated by the hypervisor for the virtual machine from the key management agent, and stores the first stored data encryption key in the key vault provided by the BMC storage device. The BMC device subsequently receives a stored data encryption key request from the key management agent and, in response, retrieves the first stored data encryption key from the key vault provided by the BMC storage device, and transmits the first stored data encryption key to the key management agent. As will be appreciated by one of skill in the art in possession of the present disclosure, the systems and methods of the present disclosure use the BMC device to store and manage hardware and OS/application data encryption keys locally and in a manner that is agnostic of vendor solutions, encrypt transmitted data via key management functionality provided on the BMC device, and handle data encryption keys in a pre-boot environment and during a boot process, thus eliminating many disadvantages associated with conventional cloud and local key management systems.

Figure 5:
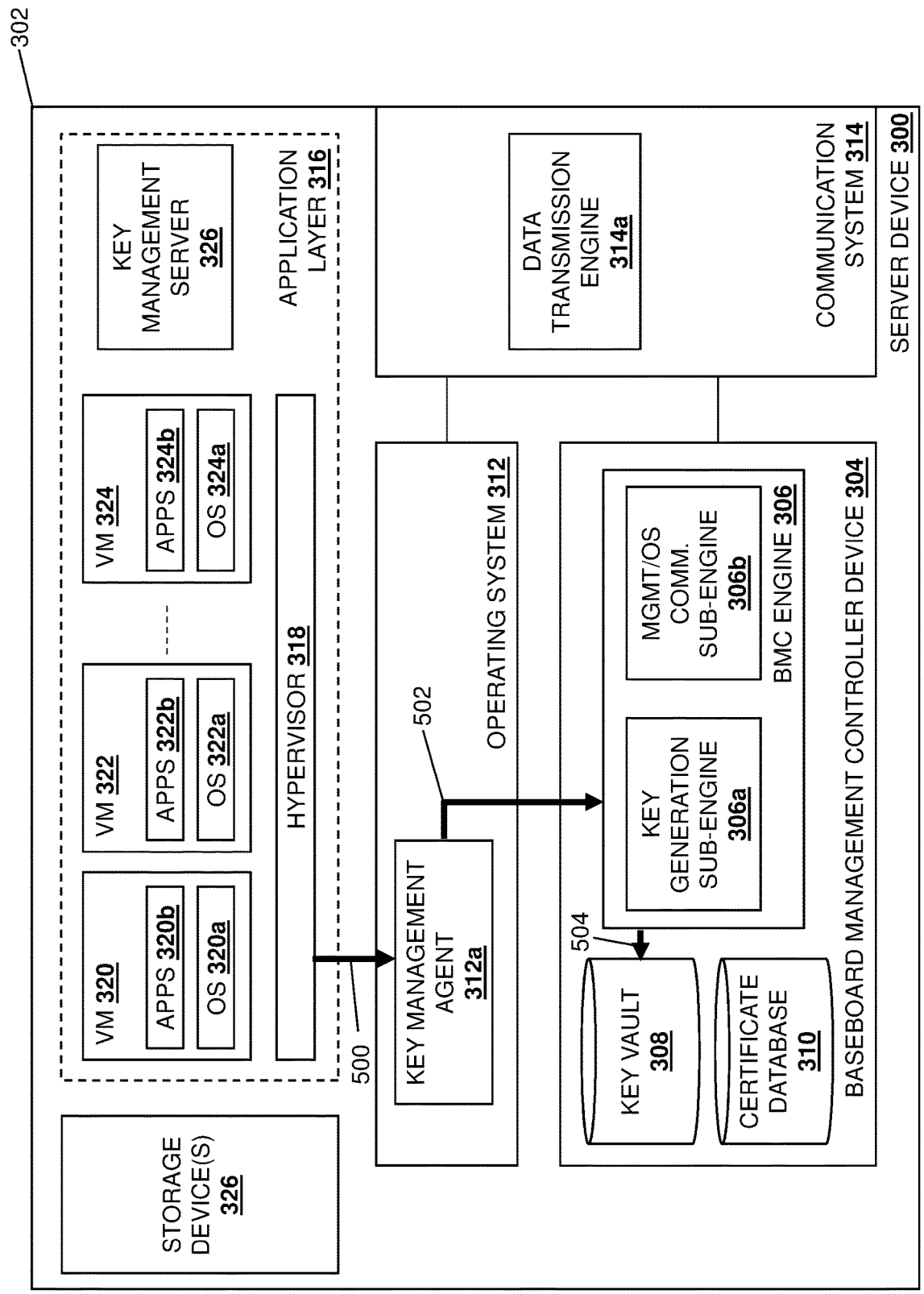
FIG. 5 is a schematic view illustrating an embodiment of the server device of FIG. 3 operating during the method of FIG. 4.

The method 400 begins at block 402 where a BMC device receives stored data encryption key(s) from a key management agent in a host operating system. With reference to FIG. 5, in an embodiment of block 402, the hypervisor 318 in the application layer 316 provided in the server device 202*a*/300 may perform stored data encryption key transmission provisioning operations 500 that may include generating respective stored data encryption keys for any of the VMs 320, 322 and up to 324, and transmitting those stored data encryption key(s) to the key management agent 312*a* in the host operating system 312 provided in the server device 202*a*/300. As discussed in further detail below, stored data encryption keys generated for each VM 320-324 may be utilized to encrypt data generated by that VM for storage in the storage device(s) 326, as well as decrypt encrypted data stored in the storage device(s) 326, and/or perform any other data encryption operations that would be apparent to one of skill in the art in possession of the present disclosure. The key management agent 312*a* in the host operating system 312 provided in the server device 202*a*/300 may then perform stored data encryption key transmission operations 502 to transmit the stored data encryption key(s) to the BMC engine 306 in the BMC device 304 in the server device 202*a*/300. As such, at block 402, the BMC engine 306 in the BMC device 304 in the server device 202*a*/300 may receive the stored data encryption key(s) generated by the hypervisor 318 in the application layer 316 provided in the server device 202*a*/300 via the key management agent 312*a* in the host operating system 312 provided in the server device 202*a*/300.

As such, in some embodiments, stored data encryption keys may be generated by the hypervisor 318 included in the application layer 316 provided in the server device 202*a*/300 for various purposes, and one of skill in the art in possession of the present disclosure will appreciate how the key management agent 312*a* in the host operating system 312 provided in the server device 202*a*/300 may perform "handshake" operations between the key management server 326 in the application layer 316 provided in the server device 202*a*/300 and the BMC engine 306 in the BMC device 304 in the server device 202*a*/300 in order to allow stored data encryption keys to be "pushed" to the BMC device 304 in the server device 202*a*/300 as discussed above. While not discussed in detail herein, one of skill in the art in possession of the present disclosure will recognize how the key management server 326 in the application layer 316 provided in the server device 202*a*/300 may be provided with a privileged user role to request dynamic session keys (e.g., platform-vendor-specific session keys that are requested via the network from the network key management system 206) that may be used by the hypervisor 318 in the application layer 316 provided in the server device 202*a*/300 to generate or otherwise provision the stored data encryption keys discussed above that are pushed to the BMC device 304 in the server device 202*a*/300.

The method 400 then proceeds to block 404 where the BMC device stores the stored data encryption keys in a BMC storage device. With continued reference to FIG. 5, in an embodiment of block 404, the BMC engine 306 in the BMC device 304 in the server device 202*a*/300 may perform stored data encryption key storage operations 504 that include storing the stored data encryption keys received via the key management agent 312*a* in the key vault 308 in the BMC device 304 in the server device 202*a*/300. In some examples, the BMC engine 306 in the BMC device 304 in the server device 202*a*/300 may include a TPM or HSM that is configured to provide a BMC private key, and the BMC engine 306 in the BMC device 304 in the server device 202*a*/300 may utilize that BMC private key to encrypt the stored data encryption key(s) before storing those stored data encryption keys in the key vault 308 in the BMC device 304 in the server device 202*a*/300. As such, one of skill in the art in possession of the present disclosure will appreciate that access to the key vault 308 in the BMC device 304 in the server device 202*a*/300 may be restricted to only designated users (e.g., via the use of the BMC private key to encrypt data encryption keys stored therein).

In some embodiments, data encryption keys stored in the key vault 308 in the BMC device 304 in the server device 202*a*/300 may be static or transferrable. For example, static data encryption keys will remain in the key vault 308 in the BMC device 304 in the server device 202*a*/300, while transferrable data encryption keys in the key vault 308 in the BMC device 304 in the server device 202*a*/300 may be shared with other server devices, BMC devices, etc. For example, transferrable data encryption keys may be encrypted using a dynamic key generated by the key generation sub-engine 306*a* included in the BMC engine 306 in the BMC device 304 in the server device 202*a*/300, and may be transferred (e.g., transmitted via the network 204) along with the dynamic key used to encrypt them following the signing of those transferrable data encryption keys by the BMC engine 306 in the BMC device 304 in the server device 202*a*/300 (e.g., using a certificate in the certificate database 310 in the BMC device 304 in the server device 202*a*/300). As will be appreciated by one of skill in the art in possession of the present disclosure, a BMC device receiving such transferrable data encryption keys may verify their signature (e.g., using a corresponding certificate in their certificate database 310) and use the dynamic key transmitted with those transferrable data encryption keys to decrypt them before storing them in their key vault.

The method 400 then proceeds to decision block 406 where it is determined whether a stored data encryption key request has been received. In an embodiment, at decision block 406, the BMC engine 306 in the BMC device 304 in the server device 202*a*/300 may monitor to determine whether a stored data encryption key request is received, which in the examples provided below may be transmitted by the network key management system 206, or by a VM 320, 322, and/or 324. However, one of skill in the art in possession of the present disclosure will appreciate that other subsystems may transmit stored data encryption key requests while remaining within the scope of the present disclosure as well.

Figure 6A:
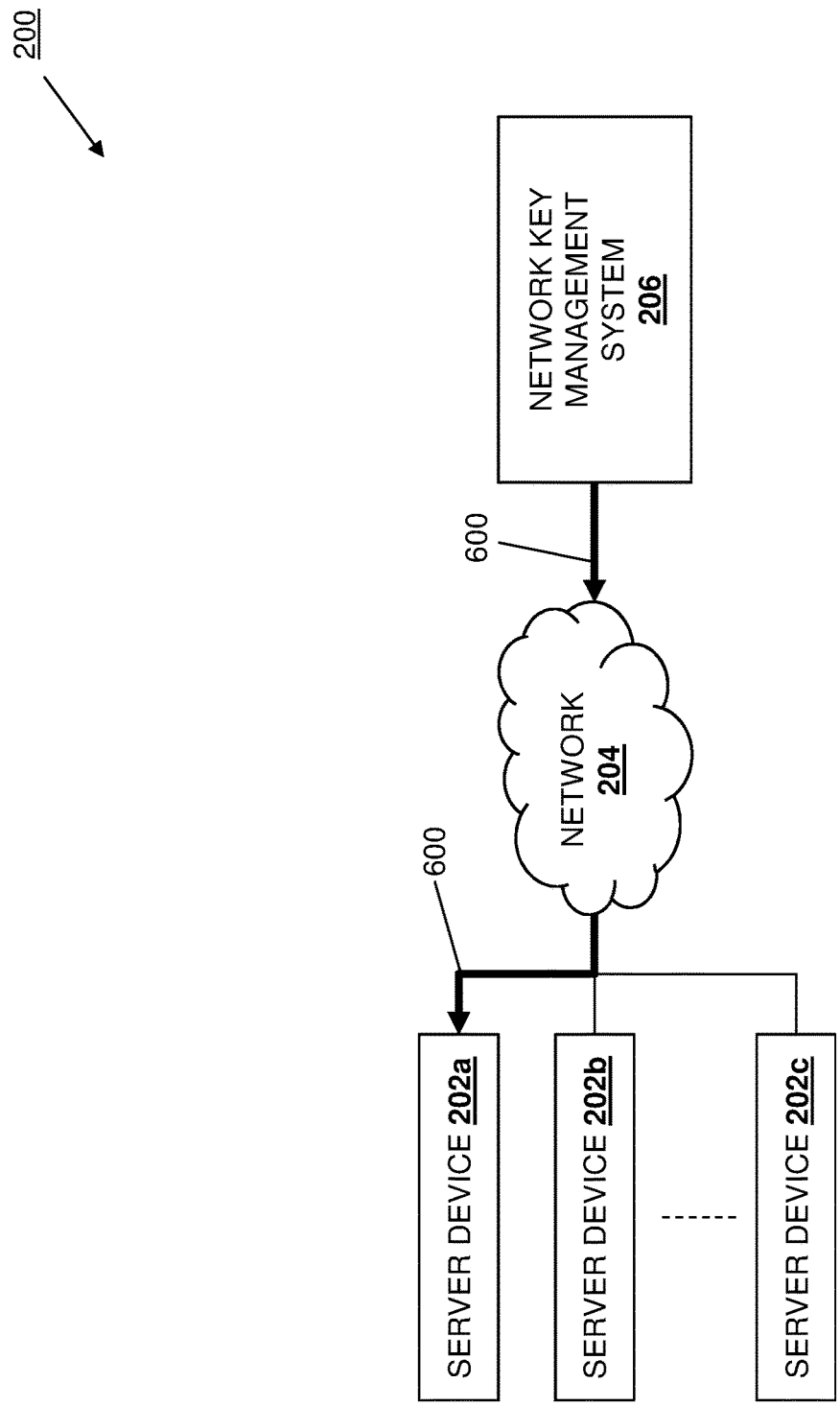
FIG. 6A is a schematic view illustrating an embodiment of the networked system of FIG. 2 operating during the method of FIG. 4.
Figure 6B:
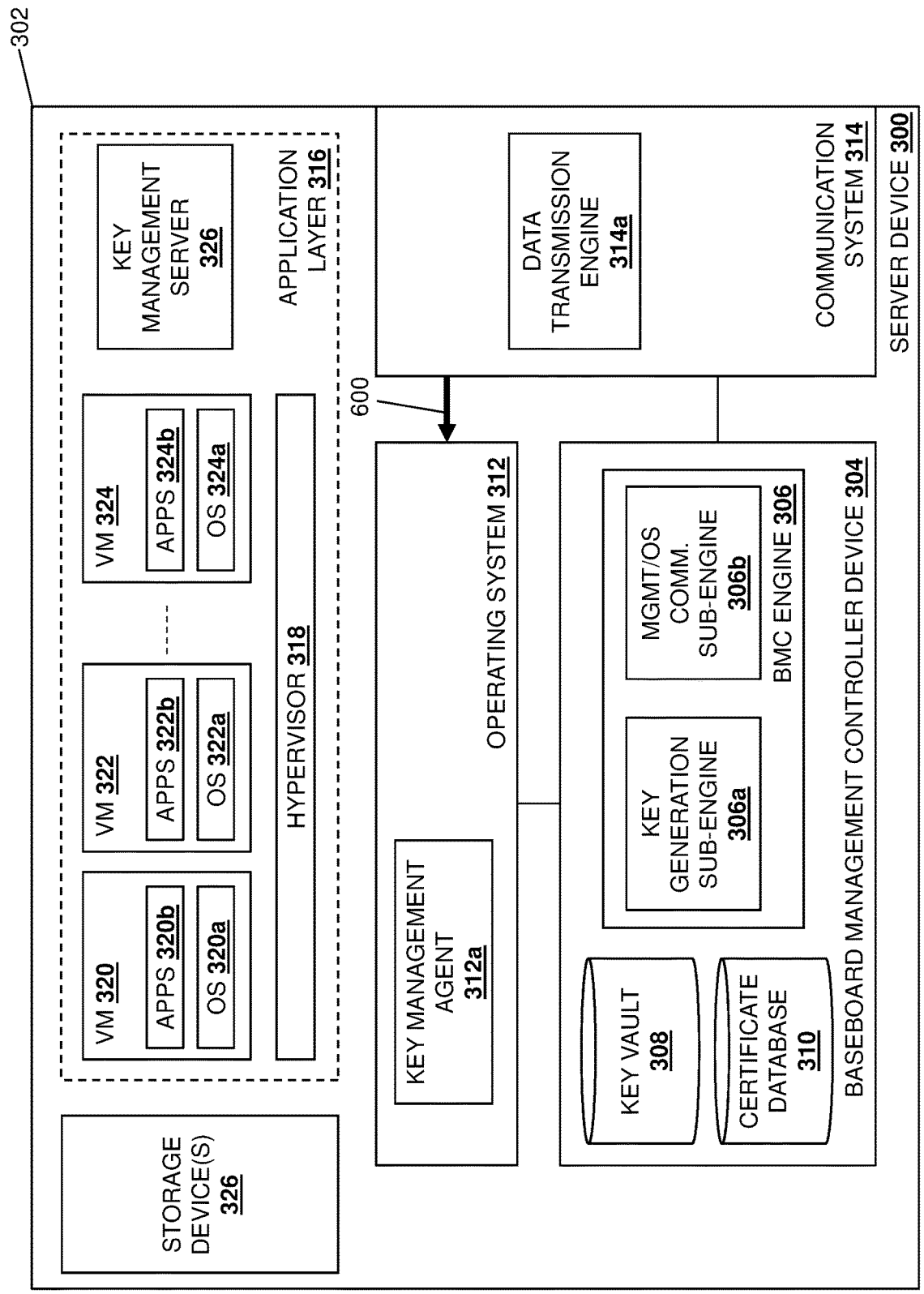
FIG. 6B is a schematic view illustrating an embodiment of the server device of FIG. 3 operating during the method of FIG. 4.
Figure 6C:
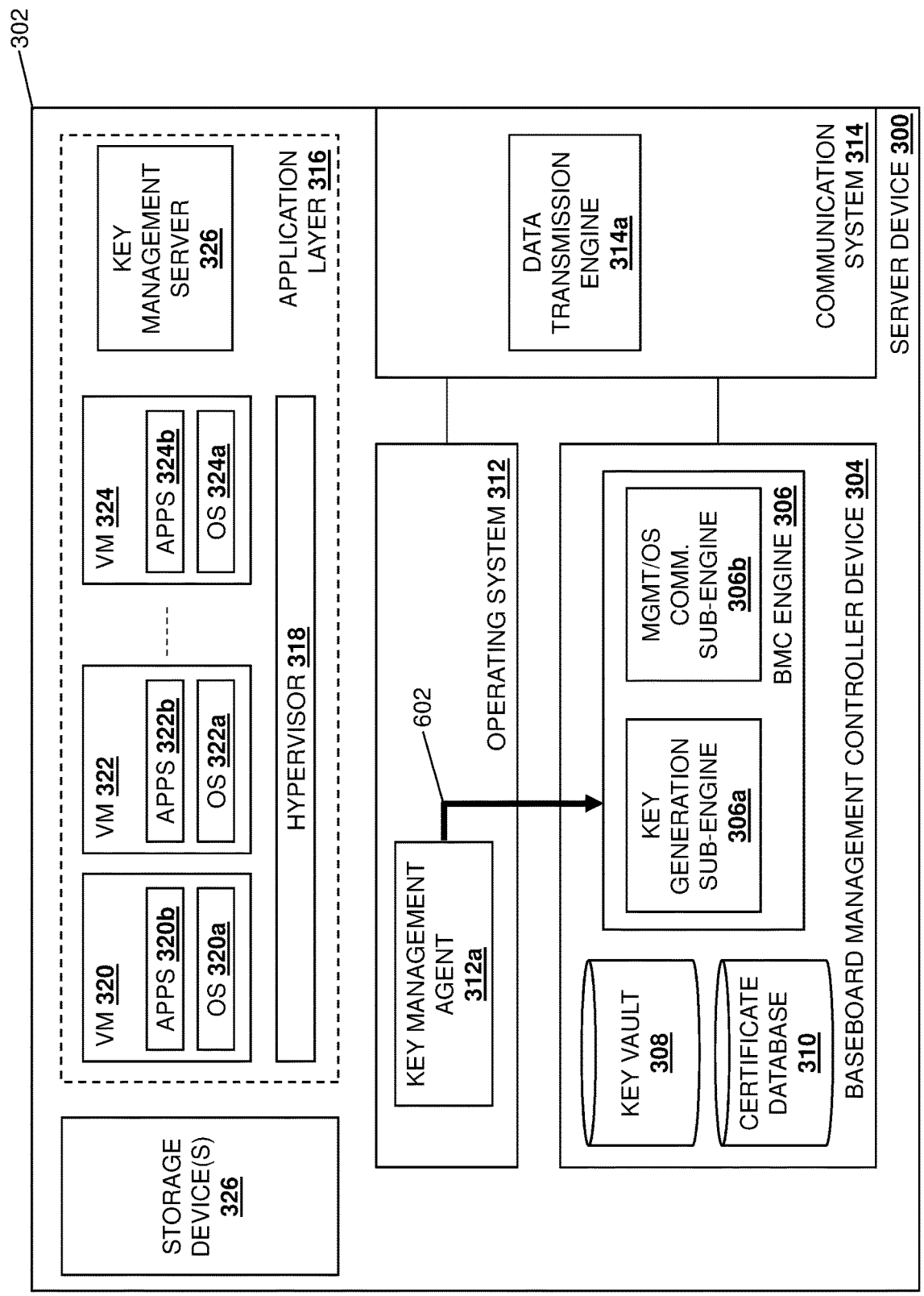
FIG. 6C is a schematic view illustrating an embodiment of the server device of FIG. 3 operating during the method of FIG. 4.

If, at decision block 406, it is determined that a stored data encryption key request has been received, the method 400 proceeds to block 408 where the BMC device retrieves a stored data encryption key from the BMC storage and provides the stored data encryption key to the key management agent. For example, with reference to FIGS. 6A and 6B, at decision block 406 the network key management system 206 may perform stored data encryption key request operations 600 that include generating and transmitting a stored data encryption key request via the network 204 and to the server device 202*a*/300 such that the stored data encryption key request is received at the host operating system 312 in the server device 202*a*/300 via the communication system 314. With reference to FIG. 6C, in response to receiving the stored data encryption key request from the network key management system 206, the key management agent 312 in the host operating system 312 provided in the server device 202*a*/300 may authenticate the stored data encryption key request and, in response, perform stored data encryption key request provisioning operations 602 to provide the stored data encryption key request to the BMC engine 306 in the BMC device 304 in the server device 202*a*/300.

Figure 6D:
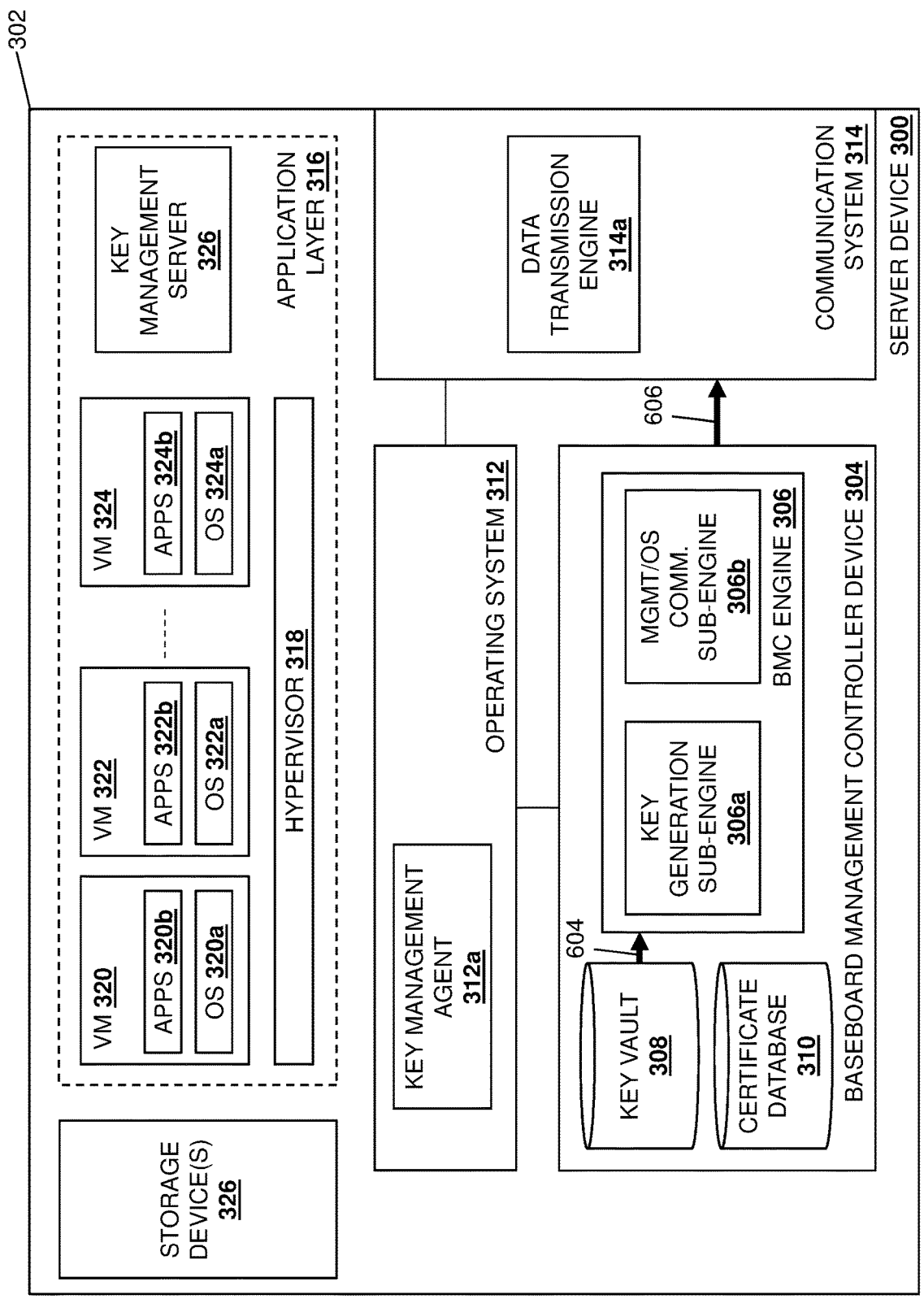
FIG. 6D is a schematic view illustrating an embodiment of the server device of FIG. 3 operating during the method of FIG. 4.
Figure 6E:
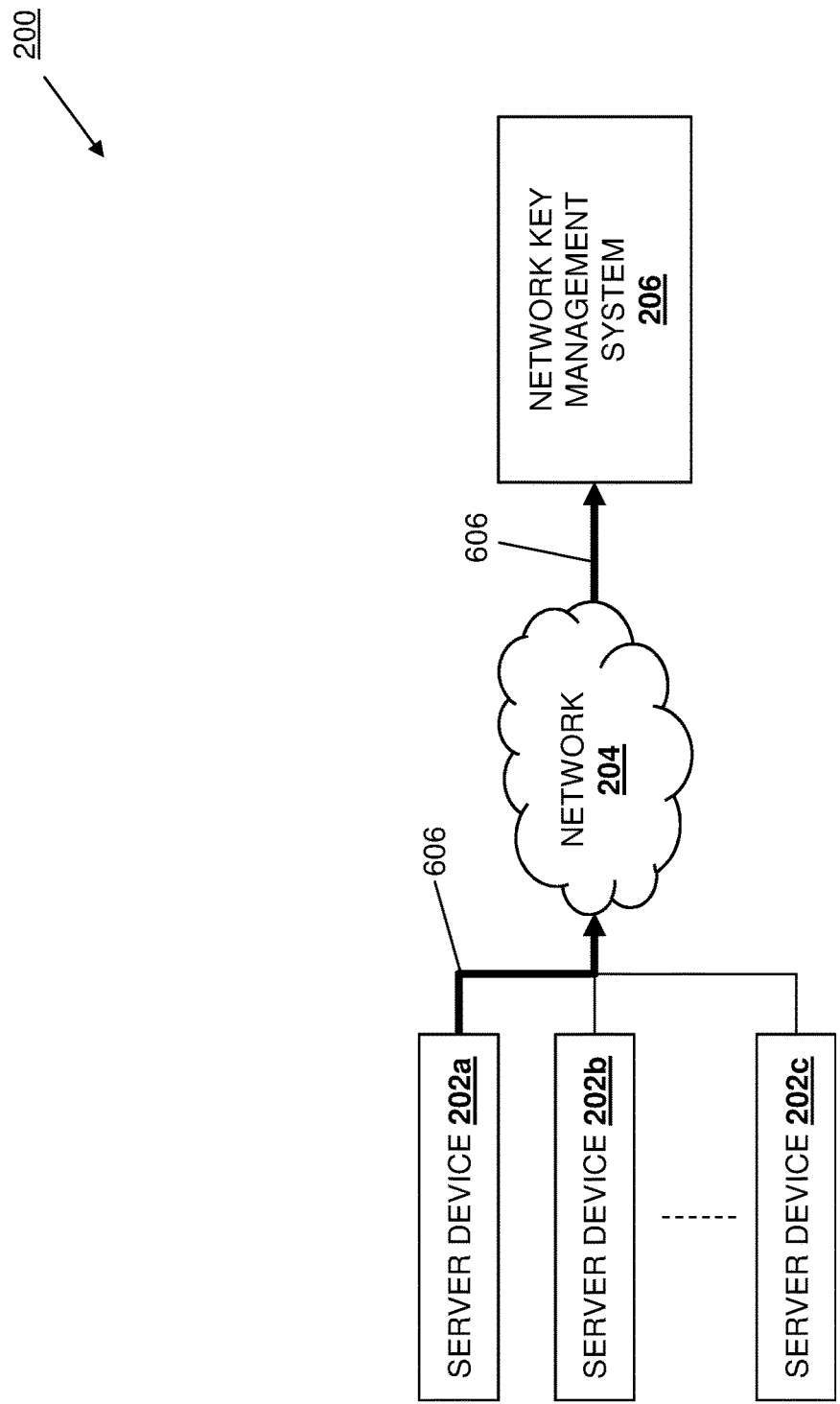
FIG. 6E is a schematic view illustrating an embodiment of the networked system of FIG. 2 operating during the method of FIG. 4.

As such, in an embodiment of block 408 and in response to receiving the stored data encryption key request from the key management agent 312*a* in the host operating system 312 in the server device 202*a*/300, the BMC engine 306 in the BMC device 304 in the server device 202*a*/300 may perform stored data encryption key retrieval operations 604 to retrieve a stored data encryption key from the key vault 308 in in the BMC device 304 in the server device 202*a*/300, as illustrated in FIG. 6D. Furthermore, FIGS. 6D and 6E illustrate how the BMC engine 306 in the BMC device 304 in the server device 202*a*/300 may perform stored data encryption key transmission operations 606 that include transmitting the stored data encryption key through the communication system 314 in the server device 202*a*/300 and via the network 204 to the network key management system 206. As discussed above, the stored data encryption key retrieved and transmitted by the BMC engine 306 in the BMC device 304 in the server device 202*a*/300 may be encrypted using a private key, and thus may require decryption (e.g., using a private key available in the network key management system 206) before it may be used by the network key management system 206. As will be appreciated by one of skill in the art in possession of the present disclosure, the stored data encryption key may subsequently be used by the network key management system 206 to encrypt data for storage, decrypt stored encrypted data, and/or perform other data encryption operations that would be apparent to one of skill in the art in possession of the present disclosure.

Figure 7A:
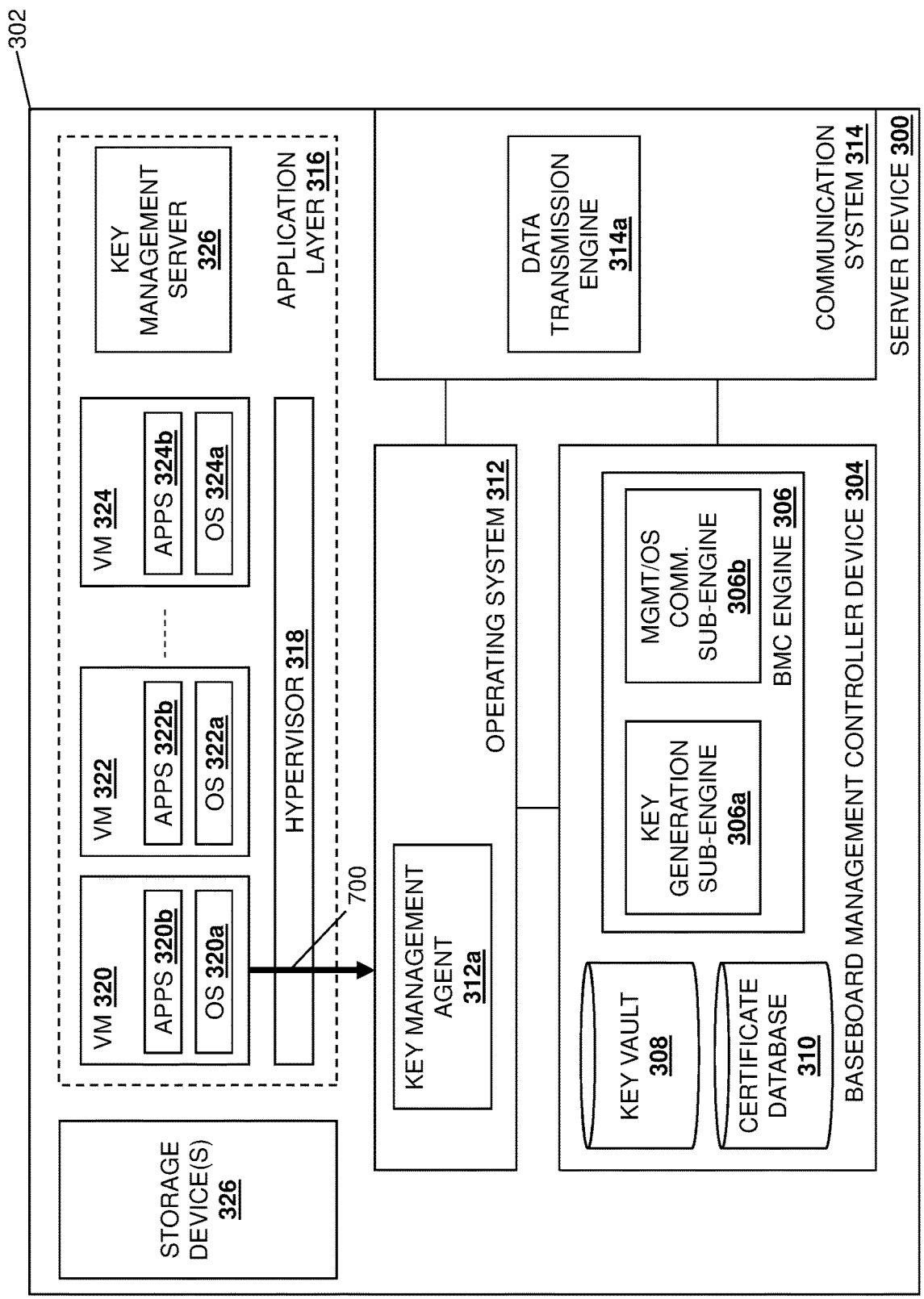
FIG. 7A is a schematic view illustrating an embodiment of the server device of FIG. 3 operating during the method of FIG. 4.
Figure 7B:
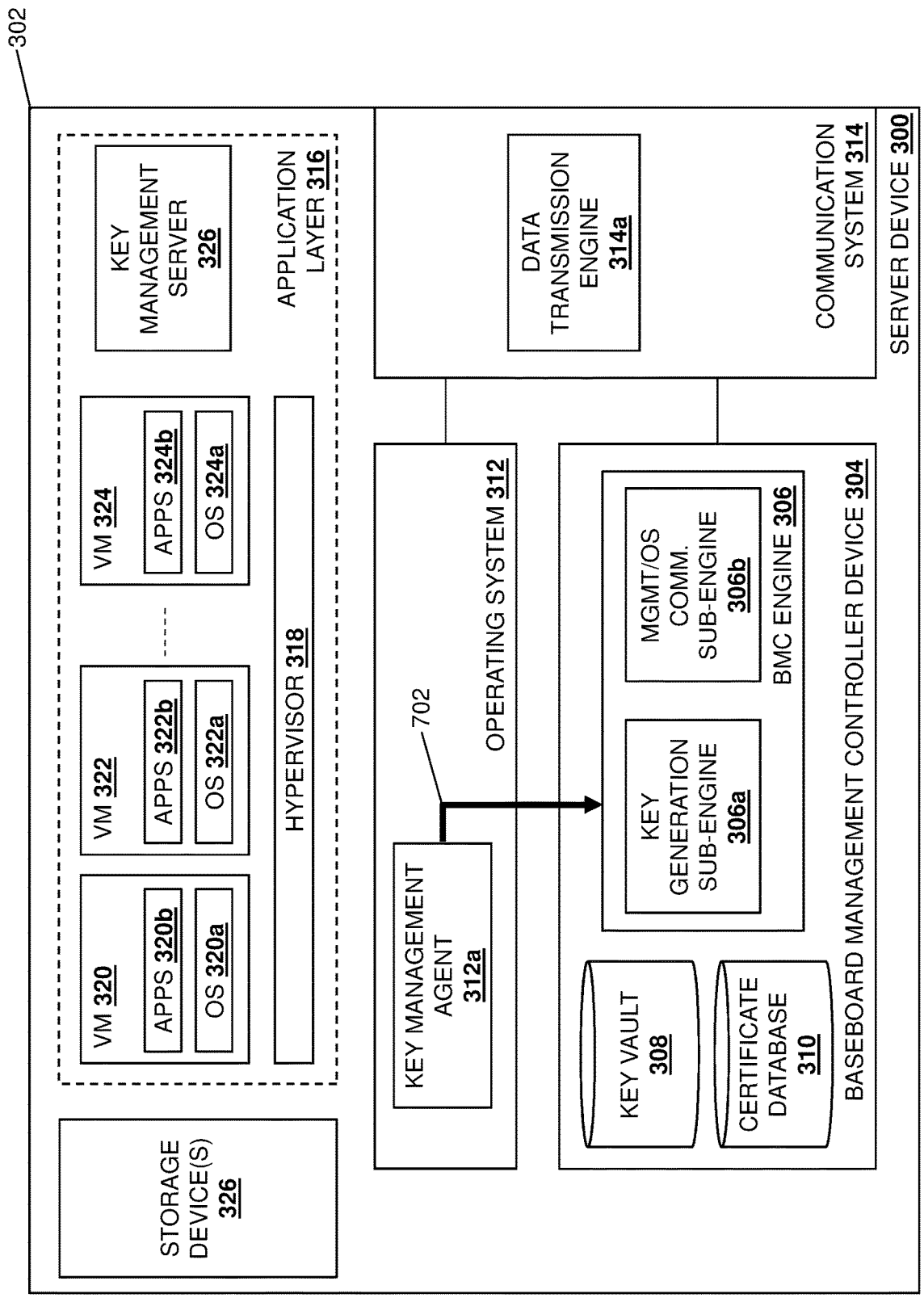
FIG. 7B is a schematic view illustrating an embodiment of the server device of FIG. 3 operating during the method of FIG. 4.

In another example, with reference to FIG. 7A, at decision block 406 the VM 320 included in the application layer 316 provided by the server device 202*a*/300 (e.g., the OS 320*a* or APPS 320*b* in the VM 320) may perform stored data encryption key request operations 700 that include generating and transmitting a stored data encryption key request to the host operating system 312 in the server device 202*a*/300 (e.g., via the hypervisor 318 in the application layer 316 provided by the server device 202*a*/300). With reference to FIG. 7B, in response to receiving the stored data encryption key request from the VM 320 via the hypervisor 318, the key management agent 312 in the host operating system 312 in the server device 202*a*/300 may authenticate the stored data encryption key request and, in response, perform stored data encryption key request provisioning operations 702 to provide the stored data encryption key request to the BMC engine 306 in the BMC device 304 in the server device 202*a*/300.

Figure 7C:
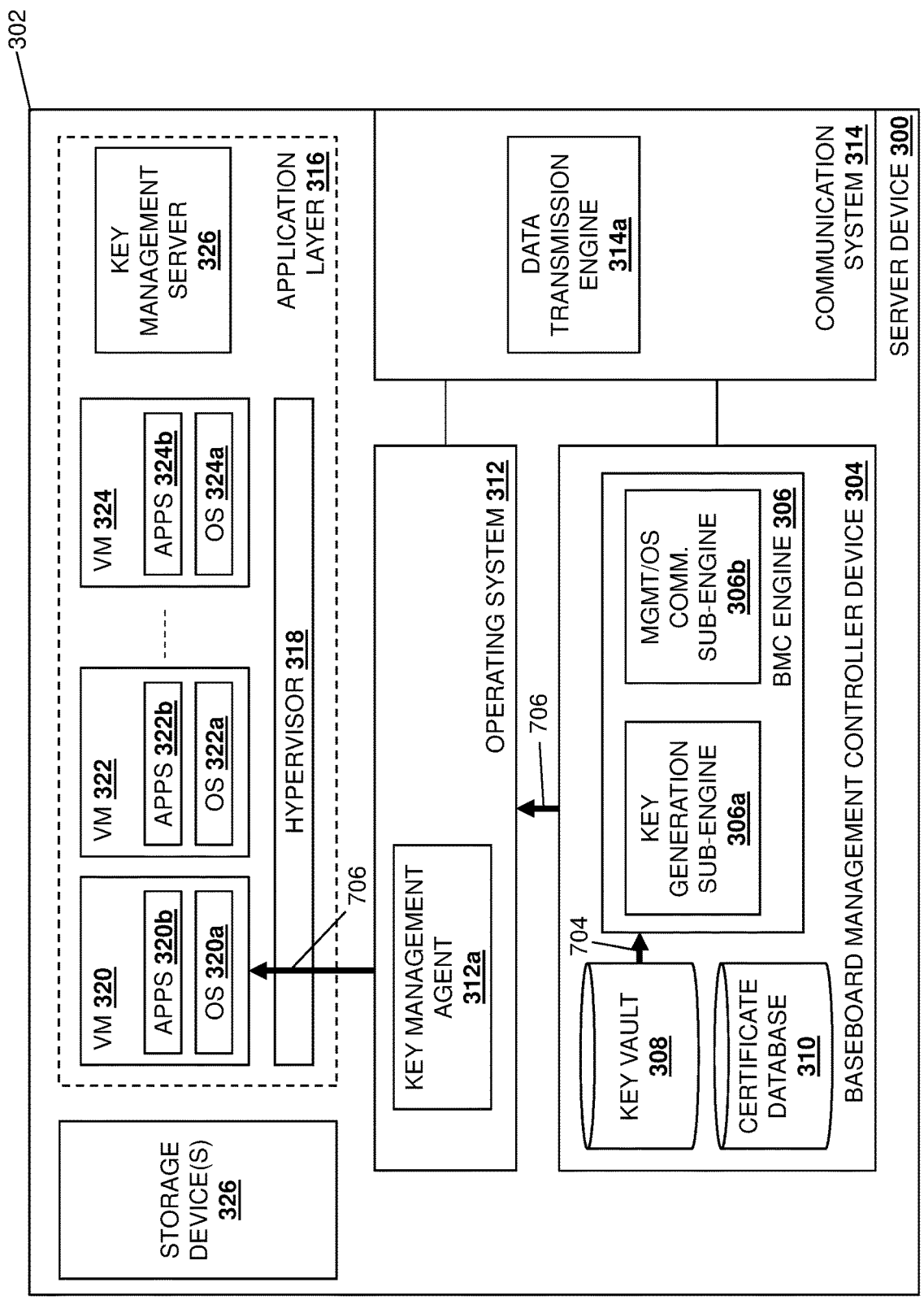
FIG. 7C is a schematic view illustrating an embodiment of the server device of FIG. 3 operating during the method of FIG. 4.

As such, in an embodiment of block 408 and in response to receiving the stored data encryption key request from the key management agent 312*a* in the host operating system 312 in the server device 202*a*/300, the BMC engine 306 in the BMC device 304 in the server device 202*a*/300 may perform stored data encryption key retrieval operations 704 to retrieve a stored data encryption key from the key vault 308 in in the BMC device 304 in the server device 202*a*/300, as illustrated in FIG. 7C. Furthermore, FIG. 7C also illustrates how the BMC engine 306 in the BMC device 304 in the server device 202*a*/300 may perform stored data encryption key transmission operations 706 that include transmitting the stored data encryption key through the host operating system 312 provided in the server device 202*a*/300 and to the VM 320 included in the application layer 316 provided by the server device 202*a*/300 (e.g., via the hypervisor 318 in the application layer 316 provided by the server device 202*a*/300). As discussed above, the stored data encryption key retrieved and transmitted by the BMC engine 306 in the BMC device 304 in the server device 202*a*/300 may be encrypted using a private key, and thus may require decryption (e.g., using a private key available from the key management server 206 in the application layer 326 provided in the server device 202*a*/300) before it may be used by the VM 320 in the application layer 326 provided in the server device 202*a*/300. As will be appreciated by one of skill in the art in possession of the present disclosure, the stored data encryption key may subsequently be used by the VM 320 to encrypt data for storage (e.g., in the storage device(s) 326), decrypt stored encrypted data (e.g., stored in the storage device(s) 326), and/or perform other data encryption operations that would be apparent to one of skill in the art in possession of the present disclosure.

Thus, for decryption purposes and/or in response to other requests by an operating system in a VM or a network key management system, the key management agent 312 in the host operating system 312 in the server device 202*a*/300 will authenticate that request and, in response, provide a data encryption key request to the BMC engine 306 in the BMC device 304 in the server device 202*a*/300 that results in transmission of an encrypted data encryption key that may then be pushed to the requestor directly for use in decrypting data (or performing other data encryption operations) once it is decrypted using a private key used to encrypt it.

In some embodiments, the provisioning of the stored data encryption keys at block 408 may be performed in a pre-boot environment, which as discussed below may require some configuration operations to allow an initialization system (e.g., a Basic Input/Output System (BIOS), a Unified Extensible Firmware Interface (UEFI), etc.) in the server device 202*a*/300 to access the stored data encryption keys. For example, the management/operating system communication sub-engine 306*b* in the BMC engine 306 in the BMC device 304 in the server device 202*a*/300 may host an embedded management operating system (e.g., using a first core in an SoC that provides the management/operating system communication sub-engine 306*b*), as well as a separate key host operating system (e.g., using a second core in an SoC that provides the management/operating system communication sub-engine 306*b*) that has access to the encrypted stored data encryption keys that may be utilized by the host operating system 312 provided in the server device 202*a*/300 while in the pre-boot environment. However, while discussed as being provided by different cores in an SoC, one of skill in the art in possession of the present disclosure will appreciate that a virtual machine/container hosted on the BMC device 304 may be utilized for the pre-boot environment functionality discussed below in the event an SoC is not available.

As such, while in the pre-boot environment, the BMC engine 306 in the BMC device 304 in the server device 202*a*/300 may initialize the key host operating system or virtual machine/container, create a repository with a data encryption key for use by the host operating system 312 being provisioned on the server device 202*a*/300 during boot operations, and configure an initialization system (e.g., a BIOS, UEFI, etc.) in the server device 202*a*/300 to identify that data encryption key needed for pre-boot/boot operations (e.g., by dynamically configuring BIOS/UEFI settings with a path to that data encryption key). As will be appreciated by one of skill in the art in possession of the present disclosure, following boot operations (or other subsequent to the use of the data encryption key), the host operating system 312 provided in the server device 202*a*/300 will signal the BMC engine 306 in the BMC device 304 in the server device 202*a*/300 to suspend the dynamic key host operating system.

If at decision block 406, it is determined that a stored data encryption key request has not been received, the method 400 proceeds to decision block 410 where it is determined whether a transmitted data encryption key request has been received. In an embodiment, at decision block 410, the BMC engine 306 in the BMC device 304 in the server device 202a/300 may monitor to determine whether a transmitted data encryption key request is received, which in the examples provided below may be transmitted by a VM 320, 322, and/or 324. However, one of skill in the art in possession of the present disclosure will appreciate that other subsystems may transmit transmitted data encryption key requests while remaining within the scope of the present disclosure as well. If, at decision block 410, it is determined that a transmitted data encryption key request has not been received, the method 400 returns to block 402. As such, the method 400 may loop such that stored data encryption key(s) may be received and stored, and stored/transmitted data encryption key requests may be monitored for until one is received.

Figure 8B:
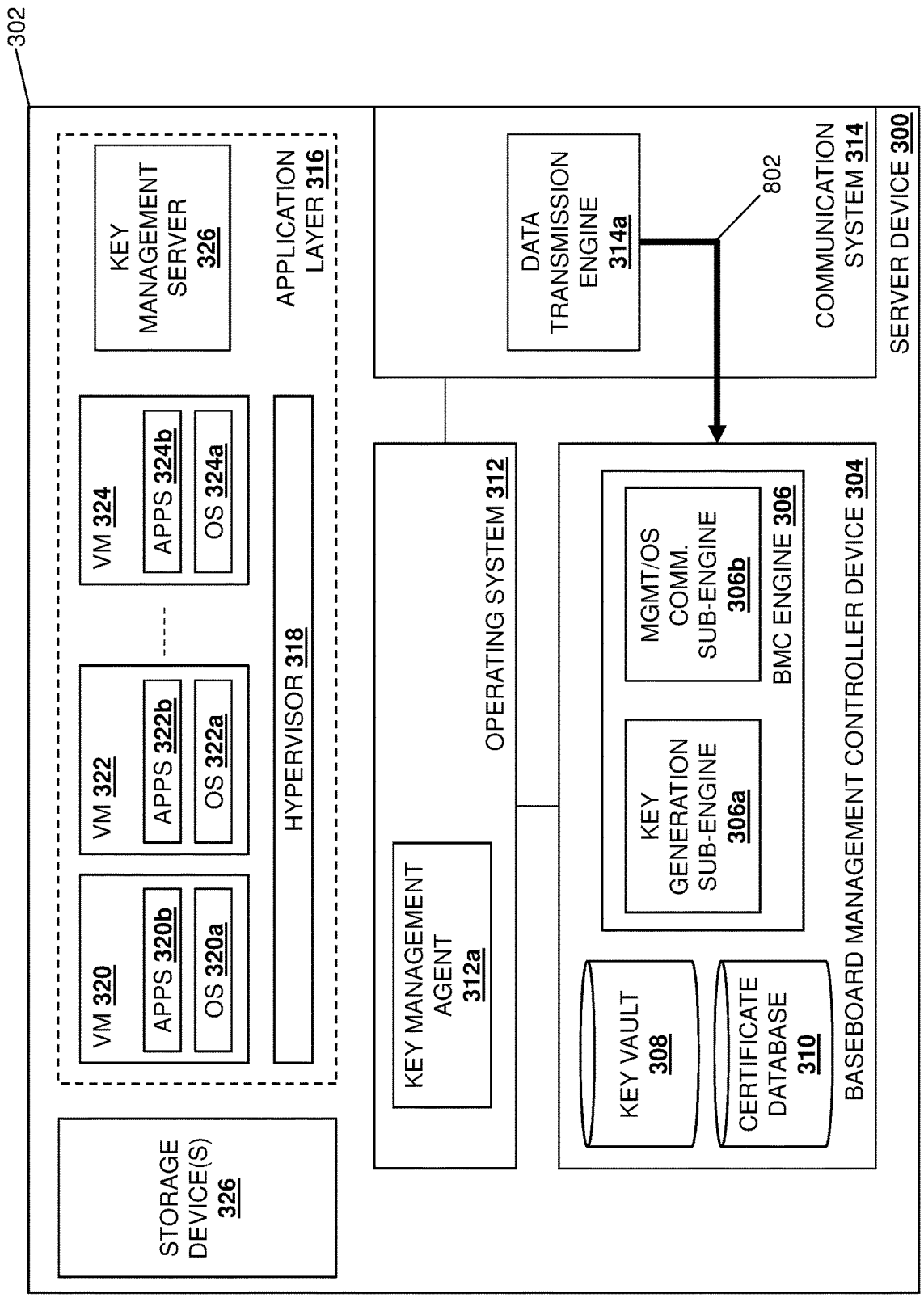
FIG. 8B is a schematic view illustrating an embodiment of the server device of FIG. 3 operating during the method of FIG. 4.

If, at decision block 410, it is determined that a transmitted data encryption key request has been received, the method 400 proceeds to block 412 where the BMC device generates a transmitted data encryption key and provides the transmitted data encryption key to a communication system. FIGS. 8A-8D provide an example of a transmitted data encryption key request associated with a request for a data encryption key for use in the encryption of data for transmission. With reference to FIG. 8A, the VM 320 (e.g., the OS 320a or APPS 320b in the VM 320) in the application layer 316 provided in the server device 202a/300 may perform transmitted data encryption key request operations 800 that may include providing data for network transmission through the host operating system 312 provided in the server device 202a/300 and to the communication system 314 in the server device 202a/300 (e.g., via the hypervisor 318 in the application layer 316 provided in the server device 202a/300). For example, any data provided by the VM 320 for network transmission may be "dumped" on a memory subsystem in the communication system 312 via the host operating system 312 using Direct Memory Access (DMA) techniques, Remote Direct Memory Access (RDMA) techniques, and/or other data transfer techniques that would be apparent to one of skill in the art in possession of the present disclosure. As illustrated in FIG. 8B, in response to receiving the data for network transmission from the VM 320, the data transmission engine 314a (e.g., an SoC or FPGA) in the communication system 314 in the server device 202a/300 may perform transmitted data encryption key request operations 802 that may include generating and transmitting a transmitted data encryption key request to the BMC device 304.

Figure 8C:
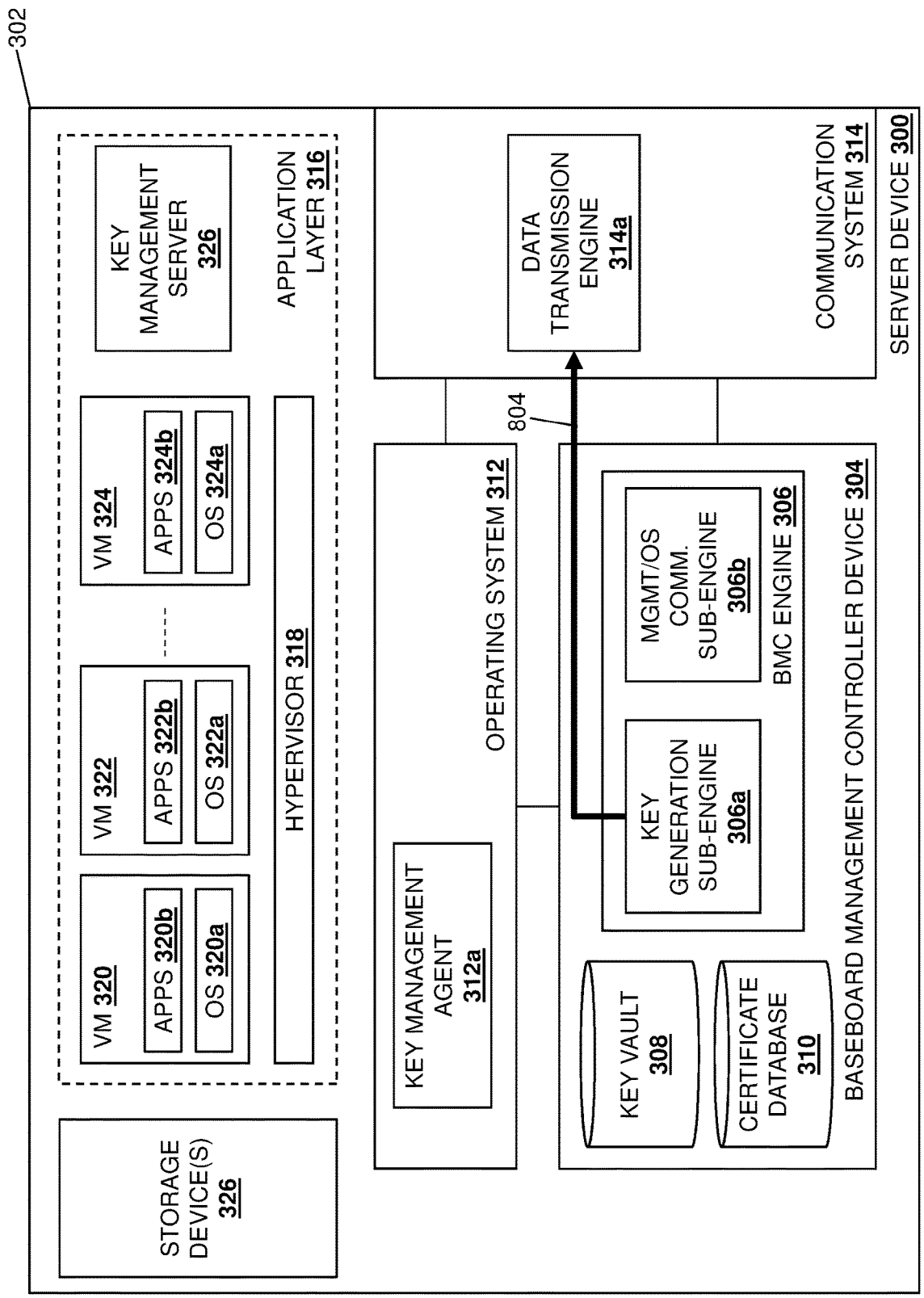
FIG. 8C is a schematic view illustrating an embodiment of the server device of FIG. 3 operating during the method of FIG. 4.
Figure 8D:
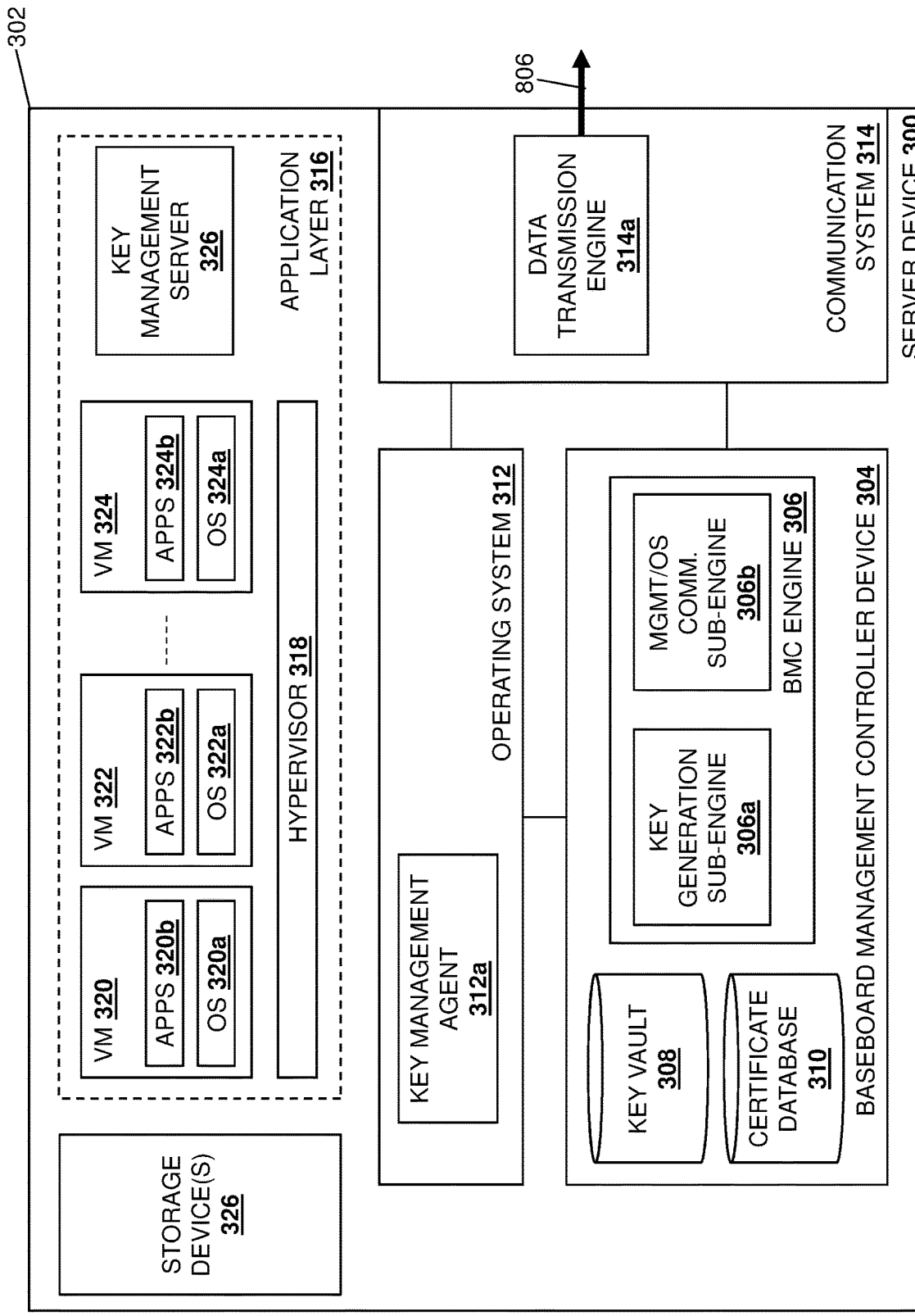
FIG. 8D is a schematic view illustrating an embodiment of the server device of FIG. 3 operating during the method of FIG. 4.

Thus, in an embodiment of decision block 410, the BMC engine 306 in the BMC device 304 in the server device 202a/300 may determine that the transmitted data encryption key request has been received. With reference to FIG. 8C and at block 412, the key generation sub-engine 306a in the BMC engine 306 in the BMC device in the server device 202a/300 may then perform transmitted data encryption key provisioning operations 804 that may include generating and transmitting a transmitted data encryption key to the data transmission engine 314a in the communication system 314 in the server device 202a/300. As will be appreciated by one of skill in the art in possession of the present disclosure, the transmitted data encryption key generated by the key generation sub-engine 306a in the BMC engine 306 in the BMC device in the server device 202a/300 may be a dynamic, random key generated for use in encrypting data transmitted via the network 204. As such, the data transmission engine 314a (e.g., an SoC or FPGA) in the communication system 314 in the server device 202a/300 may utilize the transmitted data encryption key received from the key generation sub-engine 306a in the BMC engine 306 in the BMC device in the server device 202a/300 to encrypt the data received from the VM 320 in the application layer 316 provided in the server device 202a/300. In some examples, the BMC engine 306 in the BMC device in the server device 202a/300 may utilize a certificate (e.g., a hardware certificate) in the certificate database 310 to sign any data packet including the encrypted data. As illustrated in FIG. 8D, the data transmission engine 314a in the communication system 314 in the server device 202a/300 may then perform encrypted data transmission operations 806 to transmit that encrypted data via the network 204. As will be appreciated by one of skill in the art in possession of the present disclosure, the encrypted data may be transmitted along with the identity of the transmitted data encryption key used to encrypt it, which allows a system receiving that encrypted data to identify the transmitted data encryption key and use it to decrypt that encrypted data.

Figure 9A:
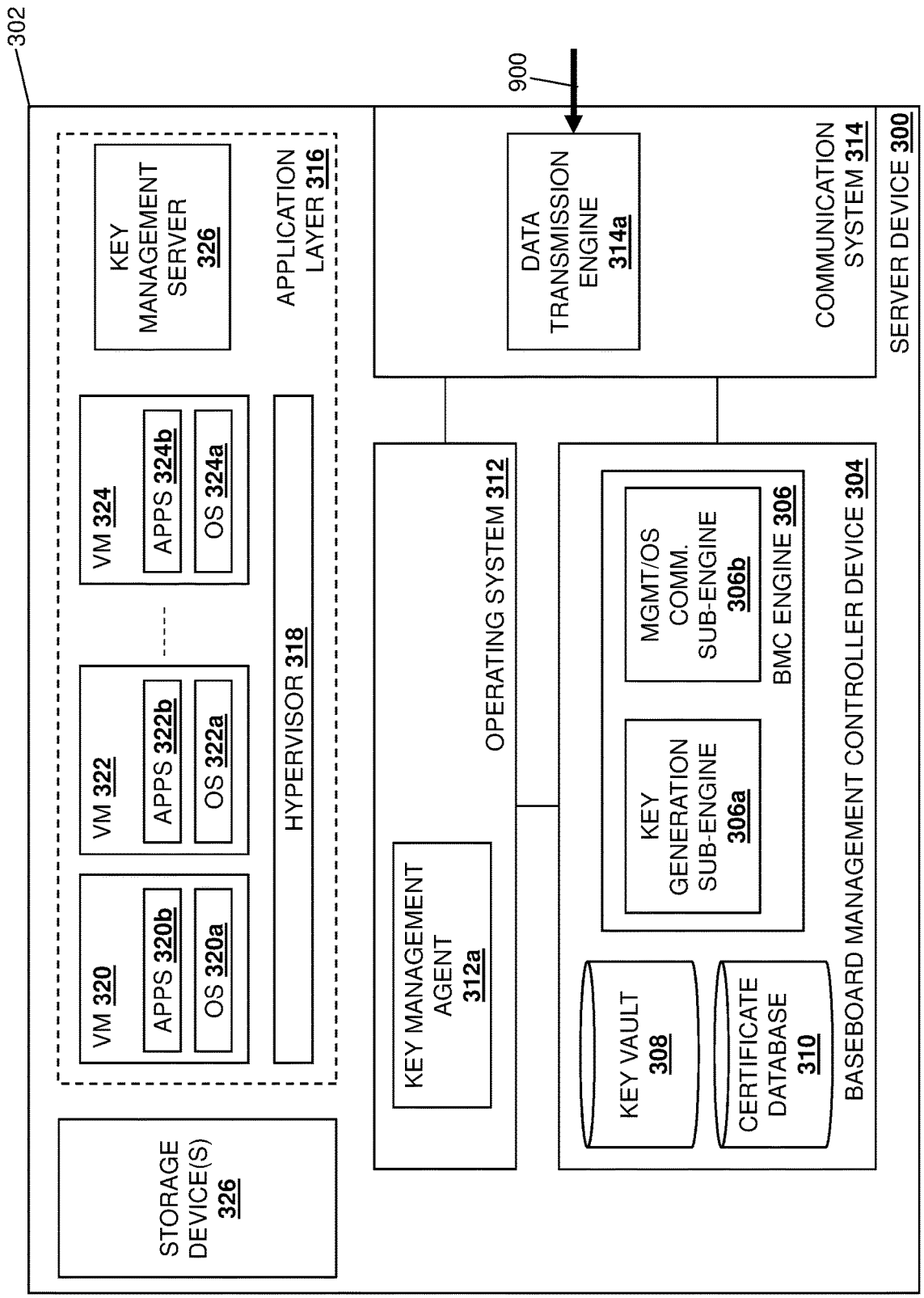
FIG. 9A is a schematic view illustrating an embodiment of the server device of FIG. 3 operating during the method of FIG. 4.
Figure 9C:
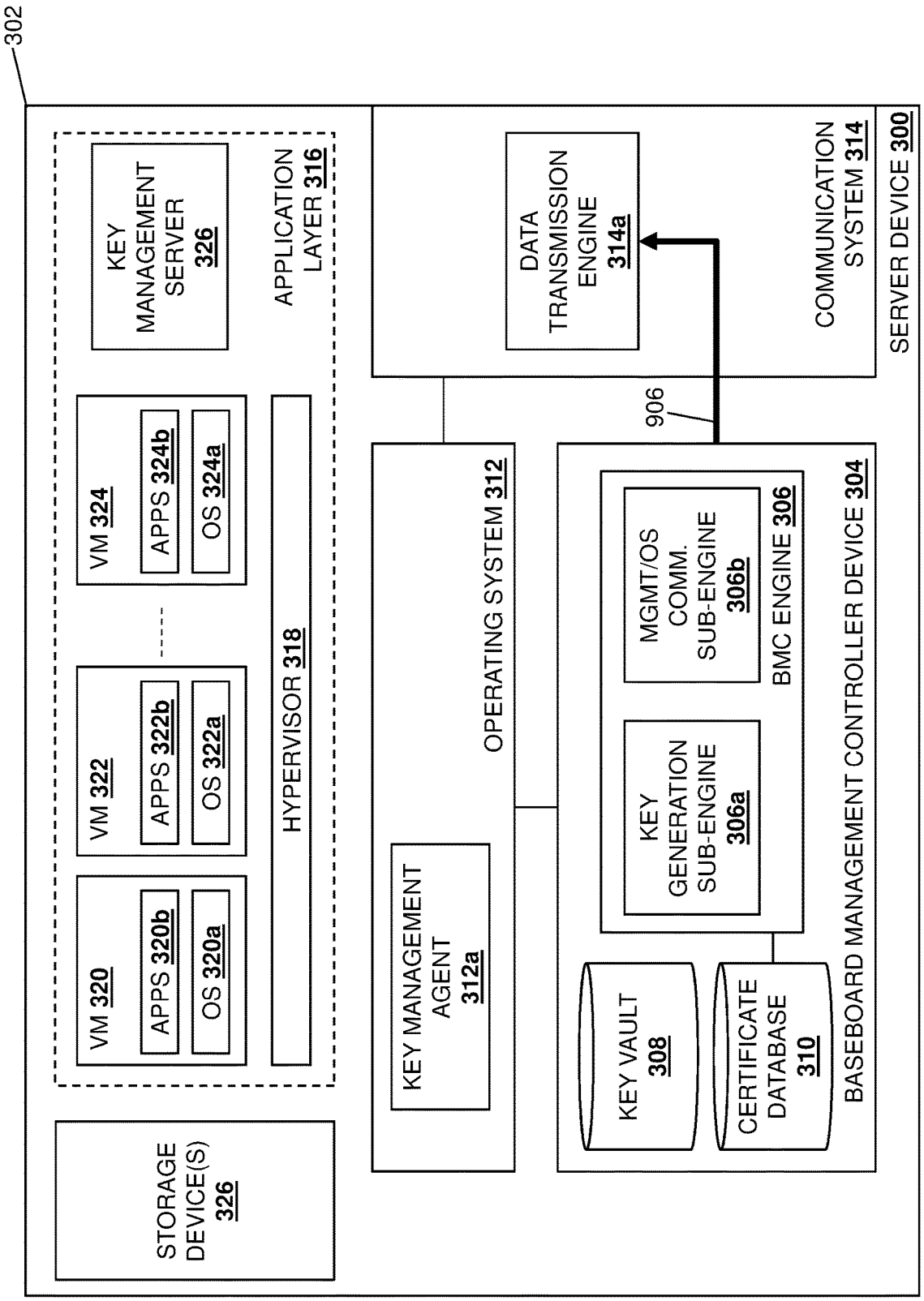
FIG. 9C is a schematic view illustrating an embodiment of the server device of FIG. 3 operating during the method of FIG. 4.

FIGS. 9A-9C provide an example of a transmitted data encryption key request associated with the decryption of data received in a transmission via the network 204 (e.g., an encrypted data transmission like that discussed above with reference to FIGS. 8A-8D). With reference to FIG. 9A, the data transmission engine 314a (e.g., an SoC or FPGA) in the communication system 314 in the server device 202a/300 may perform data receiving operations 900 that may include receiving encrypted data that was transmitted via the network 204 to the server device 202a/300. With reference to FIG. 9B, in response to receiving encrypted data via the network 204, the data transmission engine 314a in the communication system 314 in the server device 202a/300 may perform transmitted data encryption key request operations 902 that may include transmitting the encrypted data (e.g., a data packet including the encrypted data), along the identity of the transmitted data encryption key used to encrypt it and that was received along with the encrypted data, to the BMC device 304 in the server device 202a/300.

Thus, in an embodiment of decision block 410, the BMC engine 306 in the BMC device 304 in the server device 202a/300 may determine that the transmitted data encryption key request has been received. With continued reference to FIG. 9B, the BMC engine 306 in the BMC device 304 in the server device 202a/300 may utilize a certificate (e.g., a hardware certificate) in the certificate database 310 to verify a signature provided with the encrypted data and, in response, use the identity of the transmitted data encryption key used to encrypt that encrypted data to generate that transmitted data encryption key. As illustrated in FIG. 9C, the BMC engine 306 in the BMC device 304 in the server device 202a/300 may perform transmitted data encryption key provisioning operations 906 to transmit the transmitted data encryption key to the data transmission engine 314a in the communication system 314 in the server device 202a/300. As will be appreciated by one of skill in the art in possession of the present disclosure, the data transmission engine 314a in the communication system 314 in the server device 202a/300 may then use that transmitted data encryption key to decrypt the encrypted data received via the network 204, and that decrypted data may then be provided to one of the VMs 320, 322, and up to 324, stored in the storage device(s) 326, and/or utilized in any other manner that would be apparent to one of skill in the art in possession of the present disclosure.

While several data encryption key management operations have been described above, one of skill in the art in possession of the present disclosure will recognize that other data encryption key management operations may be performed using the systems and methods of the present disclosure while remaining within its scope. For example, any data encryption keys maintained by a BMC device in a server device may be shared with authorized, KMIP-compliant BMC device(s) in other server device(s). Furthermore, server devices in the data encryption key management system of the present disclosure may be designated as part of a server cluster or group, and data encryption keys may be managed and exchanged across BMC devices in the server cluster or group in order to provide efficient use of resources, high availability of data encryption keys, and/or other benefits that would be apparent to one of skill in the art in possession of the present disclosure.

Thus, systems and methods have been described that provide for the use of a native hardware layer in a server device for the secure management of data encryption keys that may be synchronized with external key management systems. For example, the data encryption key management system of the present disclosure includes an application layer with a hypervisor and a virtual machine, a host operating system coupled to the application layer and including a key management agent, and a Baseboard Management Controller (BMC) device coupled to the host operating system and including a BMC storage device providing a key vault. The BMC device receives a first stored data encryption key that was generated by the hypervisor for the virtual machine from the key management agent, and stores the first stored data encryption key in the key vault provided by the BMC storage device. The BMC device subsequently receives a stored data encryption key request from the key management agent and, in response, retrieves the first stored data encryption key from the key vault provided by the BMC storage device, and transmits the first stored data encryption key to the key management agent. As such, the systems and methods of the present disclosure may provide a BMC device in a server device with a key vault that is used to store and manage data encryption keys, SED keys, and virtual infrastructure keys, and TPMs/HSMs for providing native hardware level encryption, along with a NIC device in the server device that encrypts data for transmission and decrypts received data at the NIC card level using data encryption keys provided by the BMC device, and with the BMC device using hardware certificates to validate received encrypted data at the NIC card level.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data encryption key management system, comprising:
   an application layer including a hypervisor and a virtual machine;
   a host operating system that is coupled to the application layer and that includes a key management agent; and
   a Baseboard Management Controller (BMC) device that is coupled to the host operating system and that includes a BMC storage device providing a key vault, wherein the BMC device is configured to:
   receive, from the key management agent, a first stored data encryption key generated by the hypervisor for the virtual machine;
   store the first stored data encryption key in the key vault provided by the BMC storage device;
   receive, from the key management agent subsequent to storing the first stored data encryption key in the key vault provided by the BMC storage device, a stored data encryption key request; and
   retrieve, in response to receiving the stored data encryption key request, the first stored data encryption key from the key vault provided by the BMC storage device, and transmit the first stored data encryption key to the key management agent.

2. The system of claim 1, further comprising:
   a communication system coupled to the BMC device, wherein the BMC device is configured to:
   receive, from the communication system, a transmitted data encryption key request; and
   generate, in response to receiving the transmitted data encryption key request, a transmitted data encryption key that is configured for use by the communication system for encrypting data received from the host operating system for transmission via a network.

3. The system of claim 2, wherein the BMC device is configured to:
   sign, using a hardware certificate, encrypted data prior to transmission of the encrypted data via the network.

4. The system of claim 1, further comprising:
   a communication system coupled to the BMC device, wherein the BMC device is configured to:
   receive, from the communication system, a transmitted data encryption key request; and
   generate, in response to receiving the transmitted data encryption key request, a transmitted data encryption key that is configured for use by the communication system for decrypting data received via a network.

5. The system of claim 4, wherein the BMC device is configured to:
   verify a signature provided with data included in the transmitted data encryption key request and, in response, generate the transmitted data encryption key.

6. The system of claim 1, further comprising:
   an initialization system coupled to the BMC device, wherein the BMC device is configured to:
   provide, in a pre-boot environment, a BMC operating system that is configured to configure the initialization system to access a second stored data encryption key while in the pre-boot environment.

7. An Information Handling System (IHS), comprising:
   a processing system; and
   a memory system that is coupled to the processing system and that includes instructions that, when executed by the processing system, cause the processing system to provide a Baseboard Management Controller (BMC) engine that is configured to:
   receive, from a key management agent included in a host operating system provided on a computing system, a first stored data encryption key generated by a hypervisor provided on the computing system for a virtual machine provided on the computing system;
   store the first stored data encryption key in a key vault provided by a BMC storage device included in the computing system;

receive, from the key management agent subsequent to storing the first stored data encryption key in the key vault provided by the BMC storage device, a stored data encryption key request; and retrieve, in response to receiving the stored data encryption key request, the first stored data encryption key from the key vault provided by the BMC storage device, and transmit the first stored data encryption key to the key management agent.

8. The IHS of claim 7, wherein the BMC engine is configured to:

receive, from a communication system included in the computing system, a transmitted data encryption key request; and generate, in response to receiving the transmitted data encryption key request, a transmitted data encryption key that is configured for use by the communication system for encrypting data received from the host operating system for transmission via a network.

9. The IHS of claim 8, wherein the BMC engine is configured to:

sign, using a hardware certificate, encrypted data prior to transmission of the encrypted data via the network.

10. The IHS of claim 7, wherein the BMC engine is configured to:

receive, from a communication system included in the computing system, a transmitted data encryption key request; and generate, in response to receiving the transmitted data encryption key request, a transmitted data encryption key that is configured for use by the communication system for decrypting data received via a network.

11. The IHS of claim 10, wherein the BMC engine is configured to:

verify a signature provided with data included in the transmitted data encryption key request and, in response, generate the transmitted data encryption key.

12. The IHS of claim 7, wherein the BMC engine is configured to:

provide, in a pre-boot environment, a BMC operating system that is configured to configure an initialization system included in the computing system to access a second stored data encryption key while in the pre-boot environment.

13. The IHS of claim 7, wherein the BMC engine is configured to:

encrypt, using a Trusted Platform Module (TPM) included in the computing system and prior to storing the first stored data encryption key in the key vault, the first stored data encryption key.

14. A method for managing data encryption keys, comprising:

receiving, by a Baseboard Management Controller (BMC) device included in a computing system from a key management agent included in a host operating system provided on the computing system, a first stored data encryption key generated by a hypervisor provided on the computing system for a virtual machine provided on the computing system;

storing, by the BMC device, the first stored data encryption key in a key vault provided by a BMC storage device included in the BMC device;

receiving, by the BMC device from the key management agent subsequent to storing the first stored data encryption key in the key vault provided by the BMC storage device, a stored data encryption key request; and retrieving, by the BMC device in response to receiving the stored data encryption key request, the first stored data encryption key from the key vault provided by the BMC storage device, and transmitting the first stored data encryption key to the key management agent.

15. The method of claim 14, further comprising:

receiving, by the BMC device from a communication system included in the computing system, a transmitted data encryption key request; and generating, by the BMC device in response to receiving the transmitted data encryption key request, a transmitted data encryption key that is configured for use by the communication system for encrypting data received from the host operating system for transmission via a network.

16. The method of claim 15, further comprising:

signing, by the BMC device using a hardware certificate, encrypted data prior to transmission of the encrypted data via the network.

17. The method of claim 14, further comprising:

receiving, by the BMC device from a communication system included in the computing system, a transmitted data encryption key request; and generating, by the BMC device in response to receiving the transmitted data encryption key request, a transmitted data encryption key that is configured for use by the communication system for decrypting data received via a network.

18. The method of claim 17, further comprising:

verifying, by the BMC device, a signature provided with data included in the transmitted data encryption key request and, in response, generating the transmitted data encryption key.

19. The method of claim 14, further comprising:

providing, by the BMC device in a pre-boot environment, a BMC operating system that is configured to configure an initialization system included in the computing system to access a second stored data encryption key while in the pre-boot environment.

20. The method of claim 14, further comprising:

encrypting, by the BMC device using a Trusted Platform Module (TPM) included in the computing system and prior to storing the first stored data encryption key in the key vault, the first stored data encryption key.

* * * * *